(12) United States Patent
Iizuka et al.

(10) Patent No.: US 9,340,648 B2
(45) Date of Patent: May 17, 2016

(54) COATING MATERIAL AND LAYERED BODY

(75) Inventors: Yuko Iizuka, Tokyo (JP); Naoto Miyake, Tokyo (JP); Tadashi Ino, Settsu (JP); Masahiro Kondo, Settsu (JP); Katsuhiko Imoto, Settsu (JP)

(73) Assignees: ASAHI KASEI E-MATERIALS CORPORATION, Tokyo (JP); DAIKIN INDUSTRIES, LTD., Osaka (JP)

( * ) Notice: Subject to any disclaimer, the term of this patent is extended or adjusted under 35 U.S.C. 154(b) by 497 days.

(21) Appl. No.: 13/576,106

(22) PCT Filed: Jan. 31, 2011

(86) PCT No.: PCT/JP2011/051931
§ 371 (c)(1),
(2), (4) Date: Jul. 30, 2012

(87) PCT Pub. No.: WO2011/093495
PCT Pub. Date: Aug. 4, 2011

(65) Prior Publication Data
US 2012/0295117 A1    Nov. 22, 2012

(30) Foreign Application Priority Data

| Feb. 1, 2010 | (JP) | 2010-020485 |
| Feb. 1, 2010 | (JP) | 2010-020486 |
| Feb. 1, 2010 | (JP) | 2010-020488 |
| Dec. 1, 2010 | (JP) | 2010-268645 |

(51) Int. Cl.

| B32B 27/30 | (2006.01) |
| C08F 214/18 | (2006.01) |
| C08L 27/12 | (2006.01) |
| C08G 73/18 | (2006.01) |
| B01J 21/06 | (2006.01) |
| B01J 31/10 | (2006.01) |
| B01J 35/00 | (2006.01) |
| B01J 35/02 | (2006.01) |
| B01J 37/02 | (2006.01) |
| C08F 8/02 | (2006.01) |
| C09D 5/16 | (2006.01) |
| C09D 7/12 | (2006.01) |
| C09D 127/18 | (2006.01) |
| C09D 179/04 | (2006.01) |
| C08F 8/12 | (2006.01) |
| C08K 3/08 | (2006.01) |

(52) U.S. Cl.
CPC .............. *C08G 73/18* (2013.01); *B01J 21/063* (2013.01); *B01J 31/10* (2013.01); *B01J 35/004* (2013.01); *B01J 35/023* (2013.01); *B01J 37/0215* (2013.01); *B01J 37/0232* (2013.01); *C08F 8/02* (2013.01); *C08F 8/12* (2013.01); *C09D 5/1618* (2013.01); *C09D 5/1668* (2013.01); *C09D 7/1216* (2013.01); *C09D 127/18* (2013.01); *C09D 179/04* (2013.01); *C08K 3/08* (2013.01); *C08L 27/12* (2013.01); *Y10T 428/3154* (2015.04)

(58) Field of Classification Search
None
See application file for complete search history.

(56) References Cited

U.S. PATENT DOCUMENTS

| 5,281,680 A * | 1/1994 | Grot ............................... 526/243 |
| 8,501,366 B1 * | 8/2013 | Song et al. ..................... 429/483 |
| 2003/0146148 A1 | 8/2003 | Wu et al. |
| 2004/0024123 A1 * | 2/2004 | Moya ............................... 525/72 |
| 2004/0062969 A1 * | 4/2004 | Sakaguchi et al. .............. 429/33 |
| 2005/0053822 A1 | 3/2005 | Miyake et al. |
| 2007/0281199 A1 * | 12/2007 | Lousenberg .................... 429/33 |
| 2008/0118744 A1 * | 5/2008 | Kitamura ........................ 428/335 |
| 2011/0020728 A1 | 1/2011 | Kita et al. |
| 2011/0143924 A1 | 6/2011 | Hisata et al. |

FOREIGN PATENT DOCUMENTS

| EP | 2128919 A1 | 12/2009 |
| JP | 2002-339239 A | 11/2002 |
| JP | 2006-45370 A | 2/2006 |
| JP | 2006-185832 A | 7/2006 |
| JP | 2008-222853 A | 9/2008 |
| JP | 2009-102490 A | 5/2009 |
| JP | 2009-228009 A | 10/2009 |
| WO | 98/51733 A1 | 11/1998 |
| WO | 2009116446 A1 | 9/2009 |
| WO | 2010/010600 A1 | 1/2010 |
| WO | 2010010600 A1 | 1/2010 |

OTHER PUBLICATIONS

Communication dated Jul. 6, 2015 from the European Patent Office issued in corresponding European application No. 11737204.5.

* cited by examiner

*Primary Examiner* — Ramsey Zacharia
(74) *Attorney, Agent, or Firm* — Sughrue Mion, PLLC

(57) ABSTRACT

A coating material including a perfluorocarbon sulfonic acid resin which is a copolymer including a polymerization unit represented by —$(CF_2$—$CFZ)$—, in the formula, Z being H, Cl, F, or a C1-C3 perfluoroalkyl group, and a polymerization unit represented by —$(CF_2$—$CF(-O-(CF_2)_m-SO_3H))$—, in the formula, m being an integer of 1 to 12, and the perfluorocarbon sulfonic acid resin has an equivalent weight EW of 200 to 1000. Also disclosed is a laminate including a base material and a hydrophilic layer formed from the coating material.

8 Claims, No Drawings

COATING MATERIAL AND LAYERED BODY

CROSS REFERENCE TO RELATED APPLICATIONS

This application is a National Stage of International Application No. PCT/JP2011/051931 filed on Jan. 31, 2011, which claims priority from Japanese Patent Application Nos. 2010-020485 filed Feb. 1, 2010, 2010-020486 filed Feb. 1, 2010, 2010-020488 filed Feb. 1, 2010 and 2010-268645 filed Dec. 1, 2010, the contents of all of which are incorporated herein by reference in their entirety.

TECHNICAL FIELD

The present invention relates to a coating material suitably used for covering an article, and a laminate including a coating film that is formed from the coating material.

BACKGROUND ART

In order to provide antifouling properties, photocatalytic coating materials including photocatalytic substances such as titanium oxide are generally applied to window glass, lens, inner and outer wall surfaces of buildings, various rooftops, advertising signboards, and solar battery panels, which are intended to face outdoors or for outdoor use; and charging surfaces, condensation surfaces, and icing surfaces, which are intended to face indoors or for indoor use. Photocatalytic substances subjected to excitation light accelerate various chemical reactions, which leads to exertion of antifouling properties. Such antifouling properties exerted by photocatalysts are due to hydrophilic properties of surfaces of the photocatalysts and oxidative degradation of organic substances adhered on the surfaces.

However, such conventional coating materials including photocatalysts may cause oxidative degradation of surfaces of some articles on which the coating materials applied. Therefore, coating materials which provide high hydrophilic coating films without using photocatalysts have been needed.

Patent Document 1 discloses, as a photocatalyst-free coating material for outer walls of structures, a specific composition of a hydrophilic coating material composed only of Nafion (registered trademark of EI du Pont de Nemours and Company), which is a fluororesin.

Patent Document 1: JP 2006-45370 A

SUMMARY OF THE INVENTION

Problems to be Solved by the Invention

The Nafion (registered trademark), which is a fluororesin, used in Patent Document 1 is commercially available and known as a perfluorocarbon sulfonic acid resin including a polymerization unit represented by —($CF_2$—$CF_2$)— and a polymerization unit represented by —$CF_2$—CF(—O—($CF_2CF(CF_3)O$)—($CF_2$)$_2$—$SO_3H$)—. However, when the Nafion (registered trademark) is used in a coating material for outer walls, the resulting coating film is lack in durability. Further, the coating film is lack in hydrophilic properties and exerts insufficient contamination resistance.

In view of the above described circumstances, an object of the present invention is to provide a coating material which provides a coating film having high durability, high hydrophilic properties, and excellent contamination resistance through drying and curing, even if the coating material contains no photocatalyst.

Means for Solving the Problems

The present inventors have intensively studied for solving such problems, and have found that a coating material including a specific perfluorocarbon sulfonic acid resin can provide a coating film with high durability, hydrophilic properties, and excellent contamination resistance. That is, the present inventors have found that the coating material can provide a coating film which has excellent durability, exerts excellent contamination resistance, and is provided with a surface having hydrophilic properties even if no metal oxide with a photocatalytic function is used. Thus, the present invention is completed.

The present invention is described below.

The present invention is a coating material, comprising a perfluorocarbon sulfonic acid resin, wherein the perfluorocarbon sulfonic acid resin is a copolymer including a polymerization unit represented by —($CF_2$—CFZ)—, in the formula, Z being H, Cl, F, or a C1-C3 perfluoroalkyl group, and a polymerization unit represented by —($CF_2$—CF(—O—($CF_2$)$_m$—$SO_3H$))—, in the formula, m being an integer of 1 to 12, and the perfluorocarbon sulfonic acid resin has an equivalent weight EW of 200 to 1000.

The perfluorocarbon sulfonic acid resin preferably has an equivalent weight EW of 200 to 800.

The coating material of the present invention preferably further comprises a curable functional group-containing fluoropolymer.

The coating material of the present invention preferably further comprises a photocatalyst.

The coating material of the present invention preferably further comprises a polyazol compound.

In the coating material of the present invention, the amount of the polyazol compound is preferably 0.001 to 50% by mass relative to the total mass of the perfluorocarbon sulfonic acid resin and the polyazol compound.

The polyazol compound is preferably poly[2,2'-(m-phenylene)-5,5'-bibenzoimidazole].

The coating material of the present invention preferably further comprises a polyvalent transition metal ion.

The present invention is also a laminate, comprising: a base material; and a hydrophilic layer formed from the coating material.

The laminate preferably comprises a primer layer including a curable functional group-containing fluoropolymer between the base material and the hydrophilic layer.

Effect of the Invention

Even if the coating material does not include a photocatalyst, a coating film formed by applying the coating material to a base material, and curing and drying the coating material has high durability, high hydrophilic properties, and also excellent contamination resistance. The laminate of the present invention has high durability and high hydrophilic properties because the laminate includes a layer with the hydrophilic properties.

MODES FOR CARRYING OUT THE INVENTION

The present invention is described in detail below. The present invention is not limited to the following embodiments, and various modifications can be allowed in a range within the scope of the invention.

The coating material of the present invention includes a perfluorocarbon sulfonic acid resin.

The perfluorocarbon sulfonic acid resin is a resin in which sulfonic acid groups (some of the groups may be optionally in the form of a salt) are attached to perfluorocarbons.

The perfluorocarbon sulfonic acid resin is a copolymer including a polymerization unit represented by —(CF$_2$—CFZ)—, in the formula, Z being H, Cl, F, or a C1-C3 perfluoroalkyl group, and a polymerization unit represented by —(CF$_2$—CF(—O—(CF$_2$)$_m$—SO$_3$H))—, in the formula, m being an integer of 1 to 12. The coating material of the present invention including the perfluorocarbon sulfonic acid resin with the above-described structure has high durability, high hydrophilic properties, and also provides excellent contamination resistance. In order to prepare its solution with high hydrophilic properties and a high resin concentration, it is preferable that m is an integer of 1 to 6 and Z is F.

The perfluorocarbon sulfonic acid resin is preferably prepared by hydrolysis of a perfluorocarbon sulfonic acid resin precursor comprising a copolymer of a fluorovinyl ether compound represented by the following formula (1) and a fluoroolefin monomer represented by the following formula (2).

$$CF_2=CF-O-(CF_2)_m-W \quad (1)$$

In the formula, m is an integer of 1 to 12, and W is a functional group which may be converted into —SO$_3$H by hydrolysis.

$$CF_2=CFZ \quad (2)$$

In the formula, Z is H, Cl, F, or a C1-C3 perfluoroalkyl group.

Preferred examples of the functional group W in the formula (1), which may be converted into —SO$_3$H by hydrolysis, include SO$_2$F, SO$_2$Cl, and SO$_2$Br. m is preferably an integer of 1 to 6. If m is an integer of 1 to 6, the equivalent weight EW of the perfluorocarbon sulfonic acid resin tends to be reduced and hydrophilic properties tend to be improved.

Further, in the perfluorocarbon sulfonic acid resin precursor, W in the formula (1) is preferably SO$_2$F, and Z in the formula (2) is preferably F. In order to prepare a solution of the coating material with high hydrophilic properties and a high resin concentration, it is preferable that m is an integer of 1 to 6, W is SO$_2$F, and Z is F. The copolymer having such a structure is preferably resistant to radical species which are generated by photocatalysis.

The perfluorocarbon sulfonic acid resin precursor is synthesized by a conventional means. Known examples of the conventional means include: a polymerization method (solution polymerization) in which a vinyl fluoride compound having a functional group which may be converted into —SO$_3$H by hydrolysis and gas of a fluoroolefin such as tetrafluoroethylene (TFE) are filled and dissolved in a polymerization solvent such as a fluorine-containing hydrocarbon, and the reaction is carried out by a method using a peroxide as a radical generator; a polymerization method (bulk polymerization) in which a vinyl fluoride compound is used as a polymerization solvent instead of a solvent such as fluorine-containing hydrocarbons; a polymerization method (emulsion polymerization) in which a vinyl fluoride compound and gas of a fluoroolefin are filled, and the reaction is carried out using an aqueous solution of a surfactant as a solvent; a polymerization method (miniemulsion polymerization, microemulsion polymerization) in which a vinyl fluoride compound and gas of a fluoroolefin are filled and emulsificated in an aqueous solution of a surfactant and an auxiliary emulsifier such as an alcohol; and a polymerization method (suspension polymerization) in which a vinyl fluoride compound and gas of a fluoroolefin are filled and suspended in an aqueous solution of a suspension stabilizer. Any of products prepared by the above-described polymerization methods may be used in the present embodiment.

The perfluorocarbon sulfonic acid resin precursor prepared in accordance with the above-described methods preferably has a melt index (MI) of 0.05 to 50 g/10 min, more preferably 0.1 to 30 g/10 min, and most preferably 0.2 to 20 g/10 min. The MI is amass of an extruded polymer obtained in gram for each 10 minutes, and determined in accordance with JIS K 7210 at 270° C. and at a load of 2.16 kg using a melt indexer.

Thus prepared perfluorocarbon sulfonic acid resin precursor is preferably extrusion molded using a nozzle or a die in an extruder. In the extrusion molding, a molding method and a shape of a resulting molded body are not particularly limited. In order to increase processing speeds of hydrolysis and acid treatment which are described below, the precursor is preferably molded into pellets having sizes of 0.5 cm$^3$ or smaller or may be used in the powder form it is obtained by the polymerization.

Thus molded perfluorocarbon sulfonic acid resin precursor is immersed into a basic reaction solution and hydrolyzed.

Preferred examples of the basic reaction solution used for the hydrolysis include, but are not particularly limited to, aqueous solutions of amine compounds such as dimethylamine, diethylamine, monomethylamine, and monoethylamine; aqueous solutions of hydroxides of alkali metals; and aqueous solutions of hydroxides of alkali earth metals. Among these, an aqueous solution of sodium hydroxide and an aqueous solution of potassium hydroxide are particularly preferred. The amount of the hydroxide of an alkali metal or the hydroxide of an alkali earth metal is preferably, but is not particularly limited to, 10 to 30% by mass relative to the entire amount of the reaction solution. Further, the reaction solution preferably includes a swellable organic compound such as methyl alcohol, ethyl alcohol, acetone, and DMSO. The amount of the swellable organic compound is preferably 1 to 30% by mass relative to the entire amount of the reaction solution.

The perfluorocarbon sulfonic acid resin precursor is hydrolyzed in the basic reaction solution, sufficiently rinsed with hot water and the like, and subjected to acid treatment. Examples of an acid used in the acid treatment include, but are not particularly limited to, mineral acids such as hydrochloric acid, sulfuric acid, and nitric acid; and organic acids such as oxalic acid, acetic acid, formic acid, and trifluoroacetic acid. A mixture of any of these acids and water is more preferred. Two or more kinds of the acids may be used simultaneously. The perfluorocarbon sulfonic acid resin precursor is protonated by the acid treatment so as to be a perfluorocarbon sulfonic acid resin containing —SO$_3$H. The perfluorocarbon sulfonic acid resin resulting from protonation can be dissolved in a protonic organic solvent, water, or a mixed solvent of the protonic organic solvent and the water.

The perfluorocarbon sulfonic acid resin has an equivalent weight EW (the dry weight expressed in grams of the perfluorocarbon sulfonic acid resin which provides 1 equivalent of the proton exchange group) of 200 to 1000. The equivalent weight EW of the perfluorocarbon sulfonic acid resin is preferably 200 to 950, more preferably 200 to 800, further preferably 200 to 700, particularly preferably 250 to 600, and most preferably 400 to 500. A perfluorocarbon sulfonic acid resin having an equivalent weight EW within the above range exerts excellent hydrophilic properties. As a result, a coating film formed from the coating material of the present invention has excellent hydrophilic properties, which provides an excellent effect of contamination resistance. If the equivalent weight EW is too small, a coating film with hydrophilic properties may be peeled from a base material because of its high solubility in water. If the equivalent weight EW is too large, the hydrophilic properties may be reduced.

The equivalent weight EW of the perfluorocarbon sulfonic acid resin can be determined by back titration of a solution of a salt of the perfluorocarbon sulfonic acid resin with an alkali solution.

Some sulfonic acid groups of the perfluorocarbon sulfonic acid resin may be cross-linked to control its water solubility and prevents excess swellability. For example, they are controlled by a reaction of a sulfonic acid group with a main chain, a reaction between sulfonic acid groups, cross-linking of a sulfonic acid group and salt cross-linking of a sulfonic acid group through a high molecular cross linking agent and a low molecular cross linking agent.

The equilibrium water absorption of the perfluorocarbon sulfonic acid resin is preferably at least 5% by weight, more preferably at least 7% by weight, further preferably at least 10% by weight, and particularly preferably 15% by weight. When the equilibrium water absorption is 5% by weight or more, the hydrophilic properties of the surface of the coating film are less affected by the use conditions (changes in environment, such as whether and contaminant). The maximum equilibrium water absorption is preferably 50% by weight, more preferably 45% by weight, and further preferably 40% by weight. When the equilibrium water absorption is 50% by weight or less, stable water resistance and adhesion properties to the surface of a base material can be obtained. Further, when a surface of a coating film gets wet due to rainfall, sprinkled water, or the like, the water content is remarkably increased and the effect of the contamination resistance is further increased in an area with a small EW in the surface. Therefore, such a resin is further effectively used for outdoor structures such as rooftops, outer walls, bridges, steel towers, antennae, solar battery surfaces, and sunlight reflectors.

The equilibrium water absorption (Wc) of the perfluorocarbon sulfonic acid resin is determined by the following way. A dispersion of the perfluorocarbon sulfonic acid resin in water and an alcohol solvent is cast, and dried at 160° C. or lower to make a film. The resulting film is allowed to stand for 24 hours at 23° C. and 50% relative humidity (RH). The weight of the dried film is determined to calculate the equilibrium water absorption.

The amount of the perfluorocarbon sulfonic acid resin is preferably 0.001 to 50% by mass relative to the amount of the coating material of the present invention. The maximum amount of the perfluorocarbon sulfonic acid resin is preferably 30% by mass. The minimum amount of the perfluorocarbon sulfonic acid resin is preferably 0.01% by mass.

The coating material of the present invention may include the perfluorocarbon sulfonic acid resin as a main component. From a practical point of view and a rational point of view, such a coating material can be used more efficiently when the perfluorocarbon sulfonic acid resin is mixed with a resin serving as a vehicle, a resin to be used in other known coating materials described below, an inorganic filler, or the like. For example, the perfluorocarbon sulfonic acid resin may be used as a component which accounts for a small portion of the solids content of the entire coating material (the amount of the perfluorocarbon sulfonic acid resin is 0.1 to 50% by mass and preferably 1 to 30% by mass, relative to the total solids content).

The coating material of the present invention preferably includes a solvent. The perfluorocarbon sulfonic acid resin is dissolved or dispersed in an appropriate solvent to give a solution or a dispersion thereof.

The solvent which can be used for the coating material of the present invention is not particularly limited as long as the solvent has an affinity with the perfluorocarbon sulfonic acid resin. The solvent may be used alone, or two or more solvents may be mixed.

The above solvent preferably includes one or both of water and an organic solvent. Examples of the organic solvent include: esters such as ethyl acetate, butyl acetate, isopropyl acetate, isobutyl acetate, cellosolve acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N,N-dimethylformamide and N,N-dimethylacetamide; aromatic hydrocarbons such as toluene and xylene; alcohols such as methanol, ethanol, 1-propanol, 2-propanol, 1-butanol, 2-butanol, isobutyl alcohol, tert-butyl alcohol, and propylene glycol methyl ether; hydrocarbons such as hexane and heptane; and mixed solvents of two or more thereof.

If the coating material of the present invention is applied on various base materials such as outer walls, in order to reduce drying time of the applied coating film, the boiling point of the solvent is preferably 250° C. or lower, more preferably 200° C. or lower, and further preferably 120° C. or lower.

The solvent is particularly preferably at least one solvent selected from the group consisting of water and aliphatic alcohols. Specifically, the solvent is preferably at least one solvent selected from the group consisting of water, methanol, ethanol, 1-propanol, 2-propanol, 1-butanol, 2-butanol, isobutyl alcohol, and tert-butyl alcohol.

The coating material of the present invention preferably includes a photocatalyst. Preferred examples of the photocatalyst include a metal oxide having a photocatalytic function. The metal oxide included in the coating material of the present invention serves as a photocatalyst when irradiated with light, accelerates oxidative degradation of various organic substances attached to a surface of a base material using light energy, and increases hydrophilic properties of the surface of the base material.

Examples of the metal oxide having a photocatalytic function include $TiO_2$, $ZnO$, $SrTiO_3$, $CdS$, $GaP$, $InP$, $GaAs$, $BaTiO_3$, $BaTiO_4$, $BaTi_4O_9$, $K_2NbO_3$, $Nb_2O_5$, $Fe_2O_3$, $Ta_2O_5$, $K_3Ta_3$, $Si_2O_3$, $WO_3$, $SnO_2$, $Bi_2O_3$, $BiVO_4$, $NiO$, $Cu_2O$, $SiC$, $SiO_2$, $MOS_2$, $InPb$, $RuO_2$, and $CeO_2$.

A layered oxide including at least one element selected from Ti, Nb, Ta, and V may be used as the metal oxide (see JP S62-74452 A, JP H02-172535 A, JP H07-24329 A, JP H08-89799 A, JP H08-89800 A, JP H08-89804 A, JP H08-198061 A, JP H09-248465 A, JP H10-99694 A, and JP H10-244165 A). Further, metals such as Pt, Rh, Ru, Nb, Cu, Sn, Ni, and Fe and/or oxides of such metals may be added to or fixed on the metal oxides. Further, a photocatalyst covered with porous calcium phosphate or the like may be used (see JP H10-244166 A).

In addition to these, a metal oxide to which a photocatalytic function in a visible ray region is added by a known sensitizer may be used.

Of the metal oxides having a photocatalytic function, $TiO_2$ (titanium oxide) is more preferably used because of its non-toxicity and excellent chemical stability.

There are three different crystal forms of titanium oxide, anatase, rutile, and brookite. All of them may be used.

Among these, anatase is preferred because of its highest optical activity.

The crystalline particle size (primary particle size) of the metal oxide is preferably 1 to 200 nm, and more preferably 1 to 50 nm. The crystalline particle size is a value determined by a scattering method using a laser.

The amount of the metal oxide having a photocatalytic function is 0.001 to 30% by mass relative to the coating material of the present invention. The maximum amount of the metal oxide is preferably 20% by mass. The minimum amount of the metal oxide is preferably 0.01% by mass. If the amount of the metal oxide is too large, effects corresponding to the amount may not be achieved. If the amount of the metal oxide is too small, oxidative degradation activity may be reduced.

The coating film formed from the coating material of the present invention preferably has a breathable porous portion so that the surface of the metal oxide having a photocatalyst function included in the coating film is easily exposed to moisture or air because catalytic efficiency tends to be improved.

The coating material of the present invention preferably includes a basic polymer in addition to the perfluorocarbon sulfonic acid resin. The coating material including a basic polymer is excellent in durability.

Examples of the basic polymer include a nitrogen-containing aliphatic basic polymer and a nitrogen-containing aromatic basic polymer. Examples of the nitrogen-containing aliphatic basic polymer include polyethylene imines. Examples of the nitrogen-containing aromatic basic polymer include polyaniline and polybenzimidazole which is a heterocyclic compound. The amount of the basic polymer is preferably 0.001 to 50% by mass and more preferably 0.005 to 20% by mass relative to the amount of the perfluorocarbon sulfonic acid resin. If the coating material includes such a basic polymer, it is preferably used together with the perfluorocarbon sulfonic acid resin having a low EW (EW: 200 to 500) in view of a balance between water resistance and super hydrophilic properties.

The basic polymer is more preferably a polyazol compound. The coating material of the present invention including a polyazol compound can be formed into a coating film excellent in durability. Particularly, when a perfluorocarbon sulfonic acid resin having a low EW (EW: is 200 to 500) is used, the coating material preferably includes a polyazol compound in view of a balance between water resistance and superhydrophilic properties. The coating material of the present invention including a perfluorocarbon sulfonic acid resin and a polyazol compound is highly resistant to radical species. Therefore, when including a photocatalyst, the coating material of the present invention particularly preferably includes a polyazol compound because, in such a case, a perfluorocarbon sulfonic acid resin is not decomposed by radical species which are generated by photocatalysis of the photocatalyst and a long term photocatalytic function can be obtained.

As the polyazol compound, a polymer of a five-membered heterocyclic compound containing at least one nitrogen atom in the five-membered ring. The five-membered heterocyclic compound is preferably at least one compound selected from the group consisting of a polyimidazole compound, a polybenzimidazole compound, a polybenzobisimidazole compound, a polybenzooxazole compound, a polyoxazole compound, a polythiazole compound, and a polybenzothiazole compound. A polybenzimidazol compound is more preferred, and poly[2,2'-(m-phenylene)-5,5'-bibenzoimidazole] is particularly preferred. The polyazol compound may include oxygen and/or sulfur in addition to nitrogen.

In the case where the coating material includes a polyazol compound, it is preferable that part of the polyazol compound is reacted with part of the perfluorocarbon sulfonic acid resin (for example, they are chemically bound to each other through ionic bonds to form a complex of acidic and basic ions). For example, the sulfonic acid group of the perfluorocarbon sulfonic acid resin forms an ionic bond with nitrogen in the reactive group such as an imidazole group, an oxazole group, and a thiazole group in the polyazol compound.

The presence of the chemical bonds can be confirmed using a fourier transform infrared spectrometer (hereinafter, also referred to as "FT-IR"). In measurement of the coating film formed from the coating material of the present invention using an FT-IR, a spectrum with a peak of the perfluorocarbon sulfonic acid resin which is shifted from an original position and/or a peak of the polyazol compound which is shifted from an original position shows that part of the perfluorocarbon sulfonic acid resin is reacted with part of the polyazol compound. For example, when poly[2,2' (m-phenylene)-5,5'-bibenzoimidazole] (hereinafter, referred to as "PBI") is used as the polyazol compound, shifted absorption peaks derived from chemical bonds between the sulfonic acid group in the perfluorocarbon sulfonic acid resin and the imidazole group in PBI are observed at about $1458\,cm^{-1}$, about $1567\,cm^{-1}$, and about $1634\,cm^{-1}$.

An amount of the polyazol compound is preferably 0.001 to 50% by mass, more preferably 0.005 to 20% by mass, and still more preferably 0.01 to 10% by mass, relative to the total mass of the perfluorocarbon sulfonic acid resin and the polyazol compound. A hydrophilic coating film having high durability together with good hydrophilic properties tends to be prepared by adjusting the amount of the polyazol compound within the above range.

The coating material of the present invention may include an alkali metal ion, an alkaline earth metal ion, or a polyvalent transition metal ion in addition to the perfluorocarbon sulfonic acid resin. The coating material including such a metal ion is preferable in view of water resisteance because some sulfonic acid groups of the perfluorocarbon sulfonic acid resin have a salt bridge structure. The amount of an alkali metal ion, an alkaline earth metal ion, or a polyvalent transition metal ion is preferably 0.01 to 5 eq % relative to a sulfonic acid group containted in the perfluorocarbon sulfonic acid resin. These metal ions may be used alone, or two or more metal ions may be used together.

The coating material of the present invention particularly preferably includes a polyvalent transition metal ion. The coating material of the present invention including a polyvalent transition metal ion is remarkably resistant to radical species. The reason for this is unclear, but estimated as follows: A polyvalent transition metal ion is included in the coating film formed from the coating material of the present invention that is applied on a base material, and particularly some sulfonic acid groups are ion-exchanged by a polyvalent transition metal ion; and thereby, interaction between the polyvalent transition metal ion and a residue ($—SO_3—$) of the sulfonic acid group where a proton is eliminated may effectively improve radical resistance of the coating film. When including a photocatalyst, the coating material of the present invention particularly preferably includes a polyvalent transition metal ion because the coating material becomes resistant to radicals which are generated by photocatalysis of the photocatalyst and a long term photocatalytic function can be obtained.

The polyvalent transition metal ion is preferably, but is not particularly limited to, one attachable with the sulfonic acid group of the perfluorocarbon sulfonic acid resin through an ionic bond. In order to effectively improve radical resistance, cerium ion is particularly preferred. Cerium ion is likely in the +3 valence state or the +4 valence state, but the state is not particularly limited in the present embodiment. Cerium ion is described as one example of the polyvalent transition metal ion below.

The coating material of the present invention preferably includes a perfluorocarbon sulfonic acid resin including cerium ion. Examples of a method for introducing cerium ion into the perfluorocarbon sulfonic acid resin include, but are not limited to, the methods described below:

(1) a method of immersing a perfluorocarbon sulfonic acid resin into a solution including cerium ion;
(2) a method of adding a cerium ion-containing salt in a solution of a perfluorocarbon sulfonic acid resin; and
(3) a method of mixing a solution including cerium ion and a solution of a perfluorocarbon sulfonic acid resin.

In each of the perfluorocarbon sulfonic acid resins resulting from the above methods, cerium ion is introduced into some sulfonic acid groups by ion exchange.

The cerium ion may be in the +3 valence state or the +4 valence state. Various cerium salts are used for preparing a solution including cerium ion. Specific examples of salts including +3 cerium ion include cerium acetate (Ce($CH_3COO)_3 \cdot H_2O$) cerium chloride ($CeCl_3 \cdot 6H_2O$), cerium nitrate ($Ce(NO_3)_3 \cdot 6H_2O$), cerium sulfate ($Ce_2(SO_4)_3 \cdot 8H_2O$), cerium carbonate ($Ce_2(CO_3)_3 \cdot 8H_2O$). Examples of the salt including +4 cerium ion include cerium sulfate ($Ce(SO_4)_2 \cdot 4H_2O$), diammonium cerium nitrate ($Ce(NH_4)_2(NO_3)_6$), and ammonium cerium sulfate ($Ce(NH_4)_4(SO_4)_4 \cdot 4H_2O$). Examples of an organic metal complex salt include cerium acetylacetonate ($Ce(CH_3COCHCOCH_3)_3 \cdot 3H_2O$). Cerium carbonate is particularly preferred. When cerium carbonate is added to a solution of the perfluorocarbon sulfonic acid resin and water, carbon dioxide gas is evolved and the cerium carbonate dissolves in the solution. Such a case has the advantage that no anion-species-removing process is needed because no anion species remain in the solution of the perfluorocarbon sulfonic acid resin.

For example, when the cerium ion in a trivalent state is introduced into a sulfonic acid group by ion exchange, $Ce^{3+}$ combines with three $—SO_3^-$ groups. In the present embodiment, the number of cerium ions included in the perfluorocarbon sulfonic acid resin is 0.3 to 30 eq % relative to the number of $—SO_3^-$ groups in the resin (hereinafter, the percentage is referred to as "cerium ion content"). In the case where the cerium ion in a +3 valence state completely combines with three $—SO_3^-$ groups, the range of the number of cerium ions is equivalent to that the percentage of sulfonic acid groups including cerium ion that is introduced by ion exchange is 0.9 to 90% relative to the total amount of the sulfonic acid groups including cerium ion introduced by ion exchange and remaining sulfonic acid groups (hereinafter, the percentage is referred to as "substitution rate"). The cerium ion content is more preferably 0.6 to 20 eq %, and further preferably 1 to 15 eq %. The substitution rate is more preferably 1.8 to 60%, and further preferably 3 to 45%. When the cerium ion content is adjusted to the above range (0.3 to 30 eq %), the coating film having high durability as well as good hydrophilic properties can be prepared. The dried and cured coating film is excellent in flexibility, resistant to radical species generated by photocatalysis, and shows a long term photocatalytic function.

The coating material of the present invention preferably includes a curable functional group-containing fluoropolymer. The coating material including a curable functional group-containing fluoropolymer can be formed into a coating film with high hydrophilic properties and good adhesive properties to a base material.

Examples of the curable functional group-containing fluoropolymer include resin polymers having an obvious melting point, elastomeric polymers having rubber elasticity, and thermoplastic elastomeric polymers having an intermediate property between the resin polymers and the elastomeric polymers.

The curable functional group is appropriately selected in accordance with simplicity of production of a polymer and curing system, and is preferably at least one functional group selected from the group consisting of a hydroxyl group, a carboxyl group, an amino group, a glycidyl group, a silyl group, a silanate group, and an isocyanate group. Among these, at least one functional group selected from the group consisting of a hydroxyl group, a cyano group, and a silyl group is more preferred in view of good curing reactivity. A hydroxyl group is particularly preferred in view of availability of a polymer and good reactivity. Such a curable functional group is usually introduced into a fluoropolymer by copolymerizing monomers that contain a curable functional group.

The curable functional group-containing fluoropolymer preferably includes a polymerization unit derived from a monomer having a curable functional group and a polymerization unit derived from a fluorinated vinyl monomer.

The monomer having a curable functional group is preferably one monomer selected from the group consisting of a hydroxyl-group-containing monomer, a carboxyl-group-containing monomer, an amino-group-containing monomer, and a silicone vinyl monomer. A hydroxyl-group-containing monomer is more preferred.

(1-1) Hydroxyl-group-containing Monomer

The hydroxyl-group-containing monomer is preferably a hydroxyl-group-containing vinyl monomer free from a carboxyl group; more preferably at least one selected from the group consisting of hydroxyl-group-containing vinyl ethers and hydroxyl-group-containing allyl ethers; and further preferably hydroxyl-group-containing vinyl ethers.

The hydroxyl-group-containing vinyl ether is preferably at least one selected from the group consisting of 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether. Among these, at least one selected from the group consisting of 4-hydroxybutyl vinyl ether, and 2-hydroxyethyl vinyl ether is particularly preferred in view of excellent polymerization reactivity and excellent curing reactivity of a functional group.

The hydroxyl-group-containing allyl ether is preferably at least one selected from the group consisting of 2-hydroxyethyl allyl ether, 4-hydroxybutyl allyl ether, and glycerol monoallyl ether.

Examples of the hydroxyl-group-containing vinyl monomer include hydroxy alkyl esters of (meth)acrylic acid, such as 2-hydroxyethyl acrylate and 2-hydroxy ethyl methacrylate.

(1-2)Carboxyl-group-containing Monomer

Examples of the carboxyl-group-containing monomer include unsaturated carboxylic acids such as unsaturated monocarboxylic acids and unsaturated dicarboxylic acids represented by formula (3), monoesters and acid anhydrides thereof,

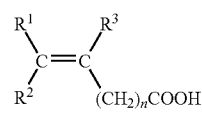

(3)

in the formula, $R^1$, $R^2$, and $R^3$ being the same as or different from one another, and each representing a hydrogen atom, alkyl group, carboxyl group, or ester group, n being 0 or 1; and carboxyl-group-containing vinyl ether monomers represented by formula (4),

(4)

in the formula, $R^4$ and $R^5$ being the same as or different from each other, and each representing a saturated or unsaturated straight chain or saturated or unsaturated circular alkyl group, n being 0 or 1, p being 0 or 1.

Specific examples of the unsaturated carboxylic acid represented by formula (3) include acrylic acid, methacrylic acid, vinylacetic acid, crotonic acid, cinnamic acid, 3-allyloxypropionic acid, 3-(2-allyloxyethoxy carbonyl)propionic acid, itaconic acid, itaconic acid monoesters, maleic acid, maleic acid monoesters, maleic acid anhydride, fumaric acid, fumaric acid monoesters, vinyl phthalate, and vinyl pyromellitate. Among these, at least one selected from the group consisting of crotonic acid, itaconic acid, maleic acid, maleic acid monoesters, fumaric acid, fumaric acid monoesters, and 3-allyloxypropionic acid is preferred because each of them is less likely to be homopolymerized and less likely to form a homopolymer.

Specific examples of the carboxyl-group-containing vinyl ether monomer represented by formula (4) include 3-(2-allyloxyethoxy carbonyl)propionic acid, 3-(2-allyloxybutoxy carbonyl)propionic acid, 3-(2-vinyloxyethoxy carbonyl)propionic acid, and 3-(2-vinyloxybutoxy carbonyl)propionic acid. One or two or more of them may be used. Among these, 3-(2-allyloxyethoxy carbonyl)propionic acid and the like are advantageous and preferred in view of stability of the monomer and good polymerization reactivity.

(1-3) Amino-group-containing Monomer

Examples of the amino-group-containing monomer include: aminovinyl ethers represented by $CH_2=CH-O-(CH_2)_x-NH_2$ (x=0 to 10); allylamines represented by $CH_2=CH-O-CO\ (CH_2)_x-NH_2$ (x=1 to 10); aminomethyl styrene; vinyl amine; acrylamide; vinyl acetamide; and vinyl formamide.

(1-4) Silicone Vinyl Monomer

Examples of the silicone vinyl monomer include: (meth) acrylic esters such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCH_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, $CH_2=C(CH_3)CO_2(CH_2)_3Si(CH_3)_2OH$, $CH_2=CH(CH_2)_3Si(OCOCH_3)_3$, $CH_2=C(CH_3)CO_2(CH_2)_3SiC_2H_5(OCOCH_3)_2$, $CH_2=C(CH_3)CO_2(CH_2)_3SiCH_3(N(CH_3)COCH_3)_2$, $CH_2=CHCO_2(CH_2)_3SiCH_3[ON(CH_3)C_2H_5]_2$, $CH_2=C(CH_3)CO_2(CH_2)_3SiC_6H_5[ON(CH_3)C_2H_5]_2$; vinyl silanes such as $CH_2=CHSi[ON=C(CH_3)(C_2H_5)]_3$, $CH_2=CHSi(OCH_3)_3$, $CH_2=CHSi(OC_2H_5)_3$, $CH_2=CHSiCH_3(OCH_3)_2$, $CH_2=CHSi(OCOCH_3)_3$, $CH_2=CHSi(CH_3)_2(OC_2H_5)$ $CH_2=CHSi\ (CH_3)_2SiCH_3(OCH_3)_2$, $CH_2=CHSiC_2H_5(OCOCH_3)_2$, $CH_2=CHSiCH_3[ON(CH_3)C_2H_5]_2$, vinyl trichlorosilane, and partial hydrolysates thereof; and vinyl ethers such as trimethoxysilyl ethyl vinyl ether, triethoxysilyl ethyl vinyl ether, trimethoxysilyl butyl vinyl ether, methyldimethoxysilyl ethyl vinyl ether, trimethoxysilyl propyl vinyl ether, and triethoxysilyl propyl vinyl ether.

The polymerization unit derived from a monomer containing a curable functional group is preferably 8 to 30 mol % relative to the total polymerization units composing the curable functional group-containing fluoropolymer. The minimum amount of the polymerization unit is preferably 10 mol %. The maximum amount of the polymerization unit is preferably 20 mol %.

The fluorinated vinyl monomer is preferably at least one monomer selected from the group consisting of tetrafluoroethylene [TFE], vinylidene fluoride, chlorotrifluoroethylene [CTFE], vinyl fluoride, hexafluoro propylene, and perfluoroalkyl vinyl ether. At least one monomer selected from the group consisting of TFE, CTFE, and vinylidene fluoride is more preferred because they are excellent in permittivity, low dielectric loss tangent, dispersibility, moisture resistance, heat resistance, fire retardancy, adhesive properties, copolymerization properties, chemical resistance, and the like. At least one monomer selected from the group consisting of TFE and CTFE is particularly preferred because they are excellent in low permittivity, low dielectric loss tangent, weather resistance, and moisture-proofing. TFE is particularly preferred. Vinylidene fluoride is preferred because it is soluble in ester solvents and is excellent in processability.

The polymerization unit derived from a fluorinated vinyl monomer is preferably 20 to 49 mol % relative to the total polymerization units composing the curable functional group-containing fluoropolymer. The minimum amount of the polymerization unit is more preferably 30 mol % and further more preferably 40 mol %. The maximum amount of the polymerization unit is more preferably 47 mol %.

The curable functional group-containing fluoropolymer preferably includes a polymerization unit derived from at least one vinyl monomer (other than fluorine atom-containing vinyl monomers) selected from the group consisting of a carboxylic acid vinyl ester, an alkyl vinyl ether, and a non-fluorinated olefin. A carboxylic acid vinyl ester improves the compatibility. Examples of the carboxylic acid vinyl ester include vinyl acetate, vinyl propionate, vinyl butyrate, vinyl isobutyrate, vinyl pivalate, vinyl caproate, vinyl versatate, vinyl laurate, vinyl stearate, cyclohexylcarboxylic acid vinyl ester, vinyl benzoate, and p-t-butylbenzoic acid vinyl ester. Examples of the alkyl vinyl ether include methyl vinyl ether, ethyl vinyl ether, butyl vinyl ether, and cyclohexyl vinyl ether. Examples of the non-fluorinated olefin include ethylene, propylene, n-butene, and isobutene.

The polymerization unit based on the vinyl monomer (other than fluorine atom-containing vinyl monomers) preferably accounts for all the polymerization units in the curable functional group-containing fluoropolymer other than the polymerization units derived from the monomer containing a curable functional group and derived from the fluorinated vinyl monomer.

Examples of the fluoropolymer into which a curable functional group is introduced are described below based on structural units.

Examples of the curable functional group-containing fluoropolymer include a perfluoro olefin polymer primarily including a perfluoroolefin unit, a chlorotrifluoroethylene (CTFE) polymer primarily including a CTFE unit, a vinylidene fluoride (VdF) polymer primarily including a VdF unit, and a fluoroalkyl group-containing polymer primarily including a fluoroalkyl unit.

(1) Perfluoroolefin Polymer Primarily Including Perfluoroolefin Unit

Specific examples of the perfluoroolefin polymer primarily including a perfluoroolefin unit include, a homopolymer of tetrafluoroethylene (TFE), a copolymer of TFE and hexafluoropropylene (HFP), a copolymer of TFE and perfluoro(alkyl vinyl ether) (PAVE), a copolymer of these copolymers and a monomer (hereinafter, simply referred to as other monomers) copolymerizable with these monomers.

Examples of the other monomers include, but are not limited to: carboxylic acid vinyl esters such as vinyl acetate, vinyl propionate, vinyl butyrate, vinyl isobutyrate, vinyl pivalate, vinyl caproate, vinyl versatate, vinyl laurate, vinyl stearate, cyclohexylcarboxylic acid vinyl ester, vinyl benzoate, and p-t-butylbenzoic acid vinyl ester; alkyl vinyl ethers such as methyl vinyl ether, ethyl vinyl ether, butyl vinyl ether, and cyclohexyl vinyl ether; non-fluorine olefins such as ethylene, propylene, n-butene, and isobutene; and fluoromonomers such as vinylidene fluoride (VdF), chlorotrifluoroethylene (CTFE), vinyl fluoride (VF), and fluoro vinyl ether.

Particularly, a TFE polymer primarily including TFE is preferred in view of excellent pigment dispersibility, excellent weather resistance, excellent copolymerization properties, and excellent chemical resistance.

Specific examples of the curable functional group-containing fluoropolymer include: a copolymer of TFE/isobutylene/hydroxy butyl vinyl ether/the other monomers, a copolymer of TFE/vinyl versatate/hydroxy butyl vinyl ether/the other monomers, and a copolymer of TFE/VdF/hydroxy butyl vinyl ether/the other monomers. Particularly, at least one polymer selected from the group consisting of a copolymer of TFE/isobutylene/hydroxy butyl vinyl ether/the other monomers, and a copolymer of TFE/vinyl versatate/hydroxy butyl vinyl ether/the other monomers is preferred. As a coating material including a hydroxyl-group-containing fluoropolymer that includes a polymerization unit derived from TFE, ZEFFLE GK series produced by Daikin Industries, LTD. may be used.

(2) CTFE Polymer Primarily Including Chlorotrifluoroethylene (CTFE) Unit

Specific examples of a CTFE polymer include a copolymer of CTFE/hydroxy butyl vinyl ether/the other monomers. Examples of a coating material including a hydroxyl-group-containing fluoropolymer that includes a polymerization unit derived from CTFE include LUMIFLON produced by ASAHI GLASS Co., Ltd., FLUONATE produced by DIC CORPORATION, CEFRAL COAT produced by Central Glass Co., Ltd., and ZAFLON produced by TOAGOSEI CO., LTD.

(3) VdF Polymer Primarily Including Vinylidene Fluoride (Vdf) Unit

Specific examples of a VdF polymer include a copolymer of VdF/TFE/hydroxy butyl vinyl ether/the other monomers.

(4) Fluoroalkyl group-containing Polymer Primarily Including Fluoroalkyl Unit

Specific examples of a fluoroalkyl group-containing polymer include a copolymer of $CF_3CF_2(CF_2CF_2)_nCH_2CH_2OCOCH=CH_2$ (mixture of the monomer in which n is 3 and the monomer in which n is 4)/2-hydroxyethyl methacrylate/stearyl acrylate. Examples of the fluoroalkyl group-containing polymer include UNIDYNE and FTONE produced by Daikin Industries, LTD. and Zonyl produced by E.I. du Pont de Nemours & Co.

Particularly, the perfluoroolefin polymer primarily including a perfluoroolefin unit and a VdF polymer primarily including a VdF unit are preferred. The perfluoroolefin polymer primarily including a perfluoroolefin unit described above is more preferred in view of weather resistance and moisture proofing.

The amount of the above curable functional group-containing fluoropolymer is preferably 10 to 100000 parts by mass relative to 100 parts by mass of the perfluorocarbon sulfonic acid resin. More preferably, the maximum amount of the fluoropolymer is 10000 parts by mass. More preferably, the minimum amount of the fluoropolymer is 50 parts by mass. If the amount of the curable functional group-containing fluoropolymer is too large, hydrophilic properties of the coating film may be reduced. If the amount of the curable functional group-containing fluoropolymer is too small, sufficient adhesion properties may not be achieved.

When including a curable functional group-containing fluoropolymer, the coating material of the present invention preferably includes a curing agent. The curing agent is at least one selected from the group consisting of isocyanates and a melamine resin.

Examples of the isocyanates include: aliphatic isocyanates such as butane diisocyanate, pentane diisocyanate, hexamethylene diisocyanate (HDI), and triisocyanatononane; alicyclic isocyanates such as cyclohexyl isocyanate and isophorone diisocyanate (IPDI); and aromatic isocyanates such as tolylene diisocyanate (TDI), and 4,4'-diphenylmethane diisocyanate (MDI). In view of weather resistance, aliphatic isocyanates and alicyclic isocyanates are preferred.

Examples of the melamine resin include compounds prepared by etherification of a methylol melamine derivative obtained by condensing melamine and formaldehyde with a lower alcohol such as methyl alcohol, ethyl alcohol, isopropyl alcohol, butyl alcohol, and isobutyl alcohol; and mixtures of two or more of the compounds.

Examples of the methylol melamine derivative include monomethylol melamine, dimethylol melamine, trimethylol melamine, tetramethylol melamine, pentamethylol melamine, and hexamethylol melamine.

As the melamine resin, there are a complete alkyl type, a methylol type, an imino group type, and a methylol/imino group type, which are classified according to a proportion of alkoxylated groups. They all can be used for the present invention.

The amount of the curing agent is preferably 0.1 to 5 equivalents relative to 1 equivalent of hydroxyl groups in the curable functional group-containing fluoropolymer. More preferably, the maximum amount of the curing agent is 1.5 equivalents. More preferably, the minimum amount of the curing agent is 0.5 equivalents.

The coating material of the present invention preferably includes an accelerating agent. Examples of the accelerating agent include organotin compounds, acid phosphates, reactants of acid phosphates and amines, saturated and unsaturated multivalent carboxylic acids and acid anhydrides of the multivalent carboxylic acids, organic titanate compounds, amine compounds, and lead octylate.

When the coating material of the present invention includes the curable functional group-containing fluoropolymer, the coating material of the present invention can be prepared, for example, by mixing the curable functional group-containing fluoropolymer and the perfluorocarbon sulfonic acid resin. The fluoropolymer having a curable functional group and the perfluorocarbon sulfonic acid resin may be mixed after being dispersed or dissolved in one or both of water and an organic solvent.

When the coating material of the present invention includes the curable functional group-containing fluoropolymer and a metal oxide having a photocatalytic function, the coating material of the present invention is preferably produced by the following way. A perfluorocarbon sulfonic acid resin and particles of the metal oxide having a photocatalyst function are uniformly mixed by a convenient method to give a mixture, and a curable functional group-containing fluoropolymer is added to the mixture.

The perfluorocarbon sulfonic acid resin and the particles of the metal oxide having a photocatalyst function are preferably mixed uniformly into a solution or a dispersion in which the perfluorocarbon sulfonic acid resin is dissolved or dispersed at an appropriated concentration and viscosity so that the particles of the metal oxide having a photocatalyst function are not to be precipitated. Further, the perfluorocarbon sulfonic acid resin is mixed with the metal oxide having a photocatalyst function so that the resin covers at least part of the particles of the metal oxide.

The coating material of the present invention can be produced, for example, by a production method including: preparing a solution or a dispersion of a perfluorocarbon sulfonic acid resin; dispersing particles of a metal oxide having a photocatalyst function in the solution or the dispersion to prepare a photocatalyst-containing dispersion; drying the photocatalyst-containing dispersion to prepare the particles of the metal oxide covered with the perfluorocarbon sulfonic acid resin; and adding the particles of the metal oxide covered with the perfluorocarbon sulfonic acid resin to a composition including a curable functional group-containing fluoropolymer.

The coating material of the present invention may also include a resin other than the perfluorocarbon sulfonic acid resin. In order to provide characteristics such as adhesive ability, the resin other than the perfluorocarbon sulfonic acid resin is preferably used by mixing with a known resin coating material. Examples of the resin coating material include oil paint, lacquer, a solvent-based synthetic resin (acrylic resin, epoxy resin, urethane resin, fluororesin, silicon-acrylic resin, alkyd resin, amino-alkyd resin, vinyl resin, unsaturated polyester resin, chlorinated rubber) coating material, a water-based synthetic resin (emulsion and aqueous resin) coating material, non-solvent synthetic resin coating material (powder coating material), a mineral coating material, and an electric insulating coating material. Among the resin coating materials, a silicon resin coating material, a fluororesin coating material, and a resin coating material including a silicon resin and a fluororesin are preferably used because they are persistent to a photocatalyst.

Examples of the silicon resin include alkoxysilane, organoalkoxysilanes, hydrolysis products (polysiloxane) of these and colloidal silica. Examples of the silicon resin further include an acryl-silicon resin including 1 to 80% by mass of silicon resins, an epoxy-silicon resin, an urethane-silicon resin, a resin including 1 to 80% by mass of at least one of alkoxysilane, organoalkoxysilanes, hydrolysis products (polysiloxane) of these and colloidal silica. These silicon resins may be dissolved in a solvent, or may be in a dispersed form, or powder form. The silicon resins may include additives such as a cross linking agent and a catalyst. Inorganic powder such as silica may be added.

In order to improve weather resistance and discoloration, the above-described fluororesins may be mixed with a known fluororesin dissolvable in a solvent. The known fluororesin is a resin other than the perfluorocarbon sulfonic acid resin and other than the curable functional group-containing fluoropolymer.

Examples of the method for applying the coating material of the present invention to a material to be coated include, but are not particularly limited to, known methods such as brush coating, roller coating, spray coating, and dip (immersion) coating. Particularly, spray coating is preferred because it enables formation of a uniform coating film. The thickness of the coating film applied on an object is preferably, but is not limited to, 0.1 to 50 µm. The coating film formed from the coating material of the present invention may have a breathable porous portion so as to be easily exposed to moisture or air.

The coating material of the present invention may be applied to various kinds of base materials, and thereby a laminate is formed.

Since the laminate of the present invention includes a base material and a hydrophilic layer formed from the above coating material, the laminate has high durability, high hydrophilic properties, and excellent contamination resistance. The laminate of the present invention may include the hydrophilic layer directly applied on the base material, or may include a primer layer disposed between the base material and the hydrophilic layer. The hydrophilic layer comprises at least a perfluorocarbon sulfonic acid resin, and may include the above-described additives included in the coating material.

Examples of the base material include metal, wood, concrete, and plastics. Examples of the metal include aluminum, stainless steel, and iron.

In the laminate, the thickness of the hydrophilic layer may be 0.1 to 50 µm.

The laminate may be produced, for example, by a production method including application of the coating material of the present invention to form a hydrophilic layer on a base material.

In one preferred embodiment of the laminate of the present invention, the hydrophilic layer is formed from a coating material including a curable functional group-containing fluoropolymer. Such an embodiment achieves excellent adhesive properties between the hydrophilic layer and the base material.

In another preferred embodiment of the laminate of the present invention, the laminate includes a base material, a primer layer comprising a curable functional group-containing fluoropolymer, and a hydrophilic layer formed from the coating material. Such an embodiment achieves firm adhesion between the base material and the hydrophilic layer. The thickness of the primer layer may be 0.1 to 50 µm.

The laminate may be produced, for example, by a production method including: application of a coating material including a curable functional group-containing fluoropolymer (hereinafter, referred to as "coating material for a primer layer") to form a primer layer on a base material; and application of the coating material of the present invention to form a hydrophilic layer on the primer layer.

Examples of the curable functional group-containing fluoropolymer included in the coating material for a primer layer are the same as those described above. The coating material for a primer layer preferably includes a curable functional group-containing fluoropolymer and an organic solvent.

Examples of the organic solvent which may be included in the coating material for a primer layer include: esters such as ethyl acetate, butyl acetate, isopropyl acetate, isobutyl acetate, cellosolve acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N,N-dimethylformamide and N,N-dimethylacetamide; aromatic hydrocarbons such as toluene and xylene; alcohols such as propylene glycol methyl ether; hydrocarbons such as hexane and heptane; and mixed solvents thereof.

The coating material for a primer layer preferably includes a curing agent. The curing agent is preferably at least one agent selected from the group consisting of isocyanates and a melamine resin. Examples of the isocyanates and the melamine resin are the same as those described above. In the coating material for a primer layer, the amount of the curing agent is preferably 0.1 to 5 equivalents relative to 1 equivalent of hydroxyl groups in the curable functional group-containing fluoropolymer. More preferably, the maximum amount of the curing agent is 1.5 equivalents. More preferably, the minimum amount of the curing agent is 0.5 equivalents. The coating material for a primer layer preferably includes an accelerating agent. Examples of the accelerating agent are the same as those described above.

EXAMPLES

Hereinafter, the present invention will be described in more detail based on Examples and Comparative Examples. The present invention is not limited to those Examples and various modifications can be allowed in a range within the scope thereof.

Measurement of Equivalent Weight EW of Perfluorocarbon Sulfonic Acid Resin

About 0.3 g of a perfluorocarbon sulfonic acid resin was immersed in 30 mL of a saturated NaCl aqueous solution at 25° C. and allowed to stand for 30 minutes with stirring. Acids in the saturated NaCl aqueous solution were then neutralized and titrated with a 0.01 N sodium hydroxide aqueous solution using phenolphthalein as an indicator. After the neutralization, the perfluorocarbon sulfonic acid resin in which a counter ion of the ion exchange group is sodium ion was rinsed with pure water, dried under vacuum, and weighed. The equivalent weight EW (g/eq) is calculated by the following equation in which the mole number of sodium hydroxide used for the neutralization is represented by M (mmol) and the mass of the perfluorocarbon sulfonic acid resin in which a counter ion of the ion exchange group is sodium ion is represented by w (mg).

$$EW=(w/M)-22$$

Measurement of Equilibrium Water Absorption

A dispersion of a predetermined perfluorocarbon sulfonic acid resin was applied on a clear glass plate, and dried at 140° C. for about 15 minutes. The dried resin was peeled to form a film of about 30 μm thickness. The film was allowed to stand for about 3 hours in water at 23° C. and allowed to stand for 24 hours in a room at 23° C. and a relative humidity (RH) of 50%. The resulting film was weighed. The equilibrium water absorption of the film was determined with reference to the weight of a film prepared by drying under vacuum at 80° C.

Measuring Method of Melt Index [MI]

The MI was determined in accordance with JIS K 7210 at 270° C. and at a load of 2.16 kg using MELT INDEXER TYPE C-5059D (produced by Toyo Seiki Seisaku-Sho Ltd.). The mass of the extruded polymer was obtained in grams for each 10 minutes.

Outdoor Antifouling Property Test

A coating material was applied by spraying to an aluminum plate coated with black acrylic urethane in an amount of 50 g/cm², and dried at room temperature for 30 minutes. Thus, an aluminum test plate coated with the coating material was formed. An outdoor antifouling property test was performed as follows: the aluminum test plate was exposed to the weather outdoors for two months, and visually evaluated for contamination of a portion coated with the coating material and a portion not coated with the coating material.

Durability Evaluation Through Exposure Test

A durability test was performed as follows: an aluminum test plate was subjected to an exposure test (irradiation: 60° C., 4 hours, dark•humid: 40° C., 4 hours) using a Dewpanel Light Control Weather Meter DPWL-5R model produced by Suga Test Instruments Co., Ltd. The test plate was exposed for 1000 hours, and 60°-60° specular reflectance was determined as a final glossiness. The final glossiness was divided by an initial glossiness to determine gloss retention.

Preparation Example 1

Preparation of Perfluorocarbon Sulfonic Acid Resin Precursor

A stainless steel autoclave equipped with a stirrer was charged with a 10% aqueous solution of $C_7F_{15}COONH_4$ and pure water, and sufficiently evacuated and purged with nitrogen. Then, tetrafluoroethylene ("$CF_2$=$CF_2$", hereinafter, also referred to as "TFE") gas was introduced thereinto to increase the gage pressure to 0.7 MPa. Then, an ammonium persulfate aqueous solution was poured into the autoclave to initiate the polymerization. For supplementing the portion of TFE consumed by the polymerization, TFE gas was continuously fed so that the autoclave inside pressure might be maintained at 0.7 MPa. Further, $CF_2$=$CFO(CF_2)_2$—$SO_2F$ was continuously fed in an amount corresponding to 0.70 times the mass of the fed TFE, and the polymerization was continued. Thus, a perfluorocarbon sulfonic acid resin precursor (a1) was prepared.

Perfluorocarbon-sulfonic acid resin precursors (a2) and (a3) that were different in the amount of a polymerization unit derived from $CF_2$=$CFO(CF_2)_2$—$SO_2F$ were prepared according to the same method as that described above, except the amount of $CF_2$=$CFO(CF_2)_2$—$SO_2F$ was changed.

Each perfluorocarbon sulfonic acid resin precursor was molded into a pellet.

Examples 1 to 3

Preparation of Perfluorocarbon Sulfonic Acid Resin Solution

The pellet of each of the perfluorocarbon sulfonic acid resin precursors (a1 to a3) prepared in Preparation Example 1 was brought into contact with an aqueous solution including potassium hydroxide (15% by mass) and methyl alcohol (50% by mass) at 80° C. for 20 hours to be hydrolyzed. The resulting pellet was then immersed in water at 60° C. for 5 hours. Next, the pellet was immersed in a 2 N hydrochloric acid aqueous solution at 60° C. for 1 hour and the immersion process was repeated 5 times with the use of a new hydrochloric acid aqueous solution each time. The resultant was rinsed with ion-exchange water and dried. Thus, pellets of perfluorocarbon sulfonic acid resins with respective EWs, each including a polymerization unit represented by —($CF_2$—$CF_2$)— and a polymerization unit represented by —($CF_2$—CF(—O—($CF_2$)$_2$—$SO_3$H))— were prepared.

The EWs of the perfluorocarbon sulfonic acid resins that were hydrolyzed and acid-treated were 450 (A1), 650 (A2), and 750 (A3), respectively. The MIs of the resin precursors were 1.0 g/10 minutes (A1), 1.5 g/10 minutes (A2), and 0.8 g/10 minutes (A3), respectively. The equilibrium water absorptions of the resins were 15% by weight (A1), 12% by weight (A2), and 9% by weight (A3). The maximum water absorptions of the resins that were immersed in water at 23° C. for 3 hours were 27% by weight (A1), 23% by weight (A2), and 18% by weight (A3). If the equilibrium water absorptions or maximum water absorptions are high, a coating film formed from each resin has high hydrophilic properties.

Each pellet was placed into a 5-L autoclave together with an ethanol aqueous solution (water:ethanol=50:50 (mass ratio)), and the autoclave was sealed. The contents were heated to 160° C. with stirring using a stirring blade. The temperature was maintained for 5 hours. Then, the autoclave was self-cooled. Thus, a uniform 5% by mass perfluorocarbon sulfonic acid resin dispersion was prepared. To 100 g of the perfluorocarbon sulfonic acid resin dispersion was added 100 g of pure water and the contents were stirred. The resulting solution was heated to 80° C. and concentrated with stirring to have a solid concentration of 20% by mass. Thus, a 20% perfluorocarbon sulfonic acid resin dispersion was prepared. A perfluorocarbon sulfonic acid resin dispersion with an EW of 450 was defined as AS1 (Example 1). A perfluorocarbon sulfonic acid resin dispersion with an EW of 650 was defined as AS2 (Example 2). A perfluorocarbon sulfonic acid resin dispersion with an EW of 750 was defined as AS3 (Example 3).

Each of the dispersions (AS1 to AS3) was applied by spraying to an aluminum plate coated with black acrylic urethane in an amount of 50 g/cm$^2$, and dried at room temperature for 30 minutes. Thus, an aluminum test plate coated with the coating material of the present invention was formed. An outdoor antifouling property test was performed as follows: the aluminum test plate was exposed to the weather outdoors for two months, and visually evaluated for contamination of a portion coated with the coating material and a portion not coated with the coating material. The results were that no contamination was observed on each test plate, and excellent antifouling-properties were obtained.

Durability evaluation through an exposure test (irradiation: 60° C., 4 hours, dark•humid: 40° C., 4 hours) was performed using a Dewpanel Light Control Weather Meter DPWL-5R model produced by Suga Test Instruments Co., Ltd. The test plate was exposed for 1000 hours, and measured for 60°-60° specular reflectance as a final glossiness. The glossiness was divided by an initial glossiness to determine gloss retention. The gloss retentions were 80% (AS1), 79% (AS2), and 81% (AS3).

Each of the dispersions (AS1 to AS3) was applied by dipping to a glass plate to prepare a coating film of 3 μm thickness, and dried at 160° C. for 30 minutes. Thus, a glass test plate coated with the coating material of the present invention was prepared. An antifouling property test was performed by evaluating adhesion of ink to the surface of the coating film using an oily marker. The results were that ink was less likely to adhere to each test plate, and excellent antifouling-properties were obtained.

A coating film strength test was performed using a both-way wear tester (HEIDON-TYPE 30S, produced by Shinto Scientific Co., Ltd.). The test plate was subjected to friction by ten reciprocating motions under a load of 110 g/cm$^2$ using cotton (canequim No. 3) as an abrading material. Next, the resulting cracks were evaluated using a haze meter (NDH2000, produced by Nippon Denshoku Industries Co., Ltd.). Haze values before the both-way wear test were 0.1% (AS1), 0.1% (AS2), and 0.1% (AS3) and haze values after the both-way wear test were 2.0% (AS1), 2.4% (AS2), and 2.6% (AS3), and good film strength was obtained.

A durability test was performed as follows: A hot and cold cycle test (first, 90° C.×4 hours, then, −40° C.×4 hours, and finally 40° C., 90% RH×8 hours) was performed using a constant temperature/humidity chamber (SH-661, produced by ESPEC Corp.) and a both-way wear test was performed. Haze values before the both-way wear test were 0.1% (AS1), 0.1% (AS2), and 0.2% (AS3) and haze values after the both-way wear test were 1.9% (AS1), 2.4% (AS2), and 2.4% (AS3). There was no change in the coating film strength of the test plates before and after the hot and cold cycle test. The test plates showed excellent durability.

Examples 4 to 6

Preparation of Polyazol Compound Solution

An amount 0.1 g of polybenzimidazole (poly[2,2'-(m-phenylene)-5,5'-bibenzimidazole], produced by Sigma-Aldrich Japan, weight average molecular weight 27000, hereinafter, referred to as "PBI") was sufficiently crashed, and 1 g of a 8% by mass NaOH aqueous solution and 2 g of ethanol were added thereto. The contents were stirred at 80° C. for 1 hour to sufficiently dissolve the PBI therein. An amount 7.5 g of ethanol was added thereto and the solution was stirred at 80° C. The PBI became in the dissolved state to give 10 g of PBI solution colored in dark reddish-brown as a PBI solution.

Preparation of Polyazol Compound-containing Coating Material

A mixture of 15 g of a perfluoro sulfonic acid resin solution (AS1, AS2, or AS3) and 50 g of ethanol (produced by Wako Pure Chemical Industries, Ltd.) was added to 10 g of the PBI solution to prepare a dark reddish-brown transparent solution. The dark reddish-brown transparent solution was allowed to pass through an ion-exchange resin to be subjected to ion exchange to prepare a transparent dispersion solution colored in yellow. The resulting dispersion solution was heated to 80° C. and concentrated with stirring to have a solid concentration of 20% by mass. Thus, dispersions BS1 (Example 4), BS2 (Example 5), and BS3 (Example 6) were prepared from AS1, AS2, and AS3, respectively. Coating materials were prepared according to the same method as that of Example 1, except the BS1 to BS3 were used instead of the 20% perfluorocarbon-sulfonic acid resin dispersions (AS1 to AS3) used in Example 1. An aluminum test plate was prepared similarly to Example 1 using each coating material. The results of the outdoor antifouling property test were that no contamination was observed on each test plate, and excellent antifouling-properties were obtained. The results of durability evaluation through the exposure test were that the gloss retentions were 93% (BS1), 90% (BS2), and 93% (BS3), which showed excellent durability.

Glass test plates were prepared using the respective coating materials BS1 to BS3 similarly to Example 1. The results of the antifouling property test using an oily ink were that ink was less likely to adhere to each test plate, and excellent antifouling-properties were obtained. The results of the film strength test using a both-way wear tester were that haze values before the both-way wear test were 0.1% (BS1), 0.1% (BS2), and 0.1% (BS3) and haze values after the both-way wear test were 1.2% (BS1), 1.5% (BS2), and 1.8% (BS3), and good coating film strength was obtained. The results of the durability test through the hot and cold cycle test and the both-way wear test after the durability test were that haze values before the both-way wear test were 0.1% (BS1), 0.2% (BS2), and 0.2% (BS3) and haze values after the both-way wear test were 1.4% (BS1), 1.5% (BS2), and 1.9% (BS3). There is no change in the coating film strength of the test plates before and after the hot and cold cycle test, and excellent durability was obtained.

Comparative Example 1

A coating material was prepared according to the same method as that of Example 1, except Nafion DE2021 (a 20% solution, EW: 1050, produced by E.I. du Pont de Nemours& Co.) was used instead of the 20% perfluorocarbon-sulfonic acid resin dispersions (AS1 to AS3) used in Example 1. The equilibrium water absorption of a coating film formed from the coating material was 4% by weight. An aluminum test plate was prepared similarly to Example 1 using the composition. The test plate was subjected to an outdoor antifouling property test similarly to Example 1. The result was that the surface of the test plate was contaminated. The surface was rinsed with water, but the contamination of the surface could not be removed. The result of the durability evaluation through the exposure test was that the gloss retention was 75%.

A glass test plate was prepared similarly to Example 1 using the coating material. The result of the antifouling property test using an oily ink was that ink adhered to the surface of the coating film, and antifouling-properties were insufficient. The results of the film strength test using a both-way wear tester were that a haze value before the both-way wear test was 0.1% and a haze value after the both-way wear test was 4.3%. Multiple cracks were observed on the test plate after the both-way wear test. The result of the durability test through the hot and cold cycle test and the both-way wear test after the durability test was that the coating film was completely peeled from the glass plate. Table 1 shows the results of the durability evaluation through the exposure test.

TABLE 1

|  | Before hot and cold cycle test | | After hot and cold cycle test | |
| --- | --- | --- | --- | --- |
|  | Before both-way wear test | After both-way wear test | Before both-way wear test | After both-way wear test |
| Example 1 | 0.1% | 2.0% | 0.1% | 1.9% |
| Example 2 | 0.1% | 2.4% | 0.1% | 2.4% |
| Example 3 | 0.1% | 2.6% | 0.2% | 2.4% |
| Example 4 | 0.1% | 1.2% | 0.1% | 1.4% |
| Example 5 | 0.1% | 1.5% | 0.2% | 1.5% |
| Example 6 | 0.1% | 1.8% | 0.2% | 1.9% |
| Comparative Example 1 | 0.1% | 4.3% | 0.1% | Completely peeled |

The results of Examples 1 to 3 and Comparative Example 1 clearly showed that the coating films formed from the coating materials (coating materials prepared in Examples 1 to 3) containing the perfluorocarbon-sulfonic acid resins of the present invention with an EW of 450, an EW of 650, and an EW of 750, respectively, showed excellent antifouling-properties, compared to the coating film formed from the coating material (coating material prepared in Comparative Example 1) containing Nafion DE2021 with an EW of 1050. It is considered the reason is that the perfluorocarbon-sulfonic acid resins each having an EW in the range specified by the present invention have excellent hydrophilic properties. Further, the coating films formed from the coating materials containing the perfluorocarbon-sulfonic acid resins prepared in Examples 1 to 3, respectively, showed excellent durability, compared to the coating film formed from the coating material containing Nafion DE2021 used in Comparative Example 1.

The results of Examples 4 to 6 and Comparative Example 1 showed that the coating films formed from the coating materials (coating materials prepared in Examples 4 to 6) containing a perfluorocarbon-sulfonic acid resin including a small amount of a polyazol compound showed excellent durability, compared to the coating film formed from the coating material (coating material prepared in Comparative Example 1) only containing Nafion as a binder. It is considered the reason is that part of the perfluorocarbon-sulfonic acid resin and part of the polyazol compound form chemical bonds, which results in an improvement in mechanical strength. The coating films formed from the coating materials prepared in Examples 4 to 6 showed particularly excellent durability, even compared to the coating films formed from the coating materials prepared in Examples 1 to 3.

Preparation Example 1 for Coating Material for Primer Layer

An amount 100 parts by mass of ZEFFLE GK 570 produced by Daikin Industries, LTD. (curable TFE copolymer aqueous emulsion, solids content 65% by mass, hydroxyl value 60 mg KOH/g, solvent: butyl acetate), 100 parts by mass of butyl acetate, and 6 parts by mass of a UV absorber (Uvinul 3035 produced by BASF) were mixed by stirring to prepare a clear coating material.

To 100 parts by mass of the clear coating material was blended 7 parts by mass of a curing agent (Colonate HX), 3 parts by mass of a silane coupling agent (NCO—$C_3H_6$—Si$(OCH_3)_3$) and 100 parts by mass of butyl acetate as a dilution solvent. Thus, a curable coating material 1 was prepared.

Preparation Example 2 for Coating Material for Primer Layer

An amount 223.2 parts by mass of ZEFFLE GK 570 produced by Daikin Industries, LTD. (curable TFE copolymer aqueous emulsion, solids content 65% by mass, hydroxyl value 60 mgKOH/g, solvent: butyl acetate), 250 parts by mass of a black pigment (DAIPYROXIDE 9510 produced by Dainichiseika Color & Chemicals Mfg. Co., Ltd.), and 126.8 parts by mass of butyl acetate were premixed by stirring. An amount 780 parts by mass of 1.2-mm glass beads was added and dispersed in the mixture using a pigment disperser at 1500 rpm for 1 hour. Then, the dispersion was filtered through a #80 mesh sieve to remove the glass beads, and 269.2 parts by mass of ZEFFLE GK570 was added to the resulting solution to prepare a black coating material.

To 100 parts by mass of the black coating material was blended 7 parts by mass of a curing agent (Colonate HX produced by Nippon Polyurethane Industry Co., Ltd.), 3 parts by mass of a silane coupling agent (NCO—$C_3H_6$—Si$(OCH_3)_3$), and 100 parts by mass of butyl acetate as a dilution solvent. Thus, a curable coating material 2 was prepared.

Examples 7 to 9

The curable coating material 1 or 2 was applied to an aluminum plate of 5 mm thickness by air-spraying, allowed to stand for 1 hour at room temperature, and dried at 80° C. for 30 minutes. Thus, a primer layer of 20 μm thickness was formed.

Then, similarly to Example 1, each of the AS1 to AS3 was applied by spraying to the primer layer in an amount of 50 g/m², and dried at room temperature for 30 minutes. Thus, a test plate having a hydrophilic layer was prepared.

The results of the same exposure test as that of Example 1 were that good gloss retention was obtained as shown in Table 2.

TABLE 2

|  | Example 7 | | Example 8 | | Example 9 | |
| --- | --- | --- | --- | --- | --- | --- |
| Hydrophilic layer | AS1 | | AS2 | | AS3 | |
| Primer layer | Curable coating material 1 | Curable coating material 2 | Curable coating material 1 | Curable coating material 2 | Curable coating material 1 | Curable coating material 2 |
| Gloss retention | 85% | 85% | 83% | 81% | 84% | 82% |

Cross-cut Test 100 squares were formed on the coating surfaces of the test plates obtained in Examples 1 to 3 and 7 to 9 in accordance with JIS K 5600-5-6: 1999. Cellotape (registered trademark) (adhesive tape produced by Nichiban Co., Ltd.) was sufficiently stuck to the surface, and immediately peeled off. Of the 100 squares, the number of squares in which a hydrophilic layer including a perfluorocarbon-sulfonic acid resin was not peeled by the Cellotape was evaluated. Table 3 shows the results.

TABLE 3

|  | Example 1 | Example 2 | Example 3 | Example 7 | Example 8 | Example 9 |
|---|---|---|---|---|---|---|
| The number of squares in which a hydrophilic layer was not peeled | 62/100 | 50/100 | 43/100 | 90/100 | 87/100 | 88/100 |

The results in Table 3 show that when a primer layer includes a curable functional group-containing fluoropolymer, a hydrophilic layer with good adhesive properties is obtained.

Example 10

(1.1) Polymerization Process

A perfluorocarbon-sulfonic acid resin dispersion including a polymerization unit derived from $CF_2=CF_2$ and a polymerization unit derived from $CF_2=CF-O-(CF_2)_2-SO_3H$ and having an EW of 455 was prepared as described below. A 6-L pressure tight vessel made of SUS-316 equipped with a stirring blade and a temperature controlling jacket was charged with 2850 g of reverse osmosis water, 150 g of $C_7F_{15}COONH_4$, and 1150 g of $CF_2=CFOCF_2CF_2SO_2F$. The system was purged with nitrogen and then evacuated. Then, TFE was introduced into the vessel to increase an internal pressure to 0.07 MPaG. The contents were stirred at 400 rpm and the internal temperature of the vessel was controlled to 10° C. A solution of 6 g of $(NH_4)_2S_2O_8$ in 20 g of water was fed under pressure and a solution of 0.6 g of $Na_2SO_3$ in 20 g of water was fed under pressure, and the polymerization was started. TFE was additionally introduced so that the internal pressure was maintained at 0.70 MPaG, and the polymerization was continued. A solution of 0.6 g of $Na_2SO_3$ in 20 g of water was fed under pressure every hour.

After 10 hours from the polymerization start, the pressure of TFE was discharged to terminate the polymerization when 400 g of TFE was additionally introduced. Thus, 4720 g of a polymerization solution (precursor emulsion) was prepared. The solids concentration of the obtained precursor emulsion was 24.0% by mass.

(1.2) Hydrolysis Process

An amount 2 kg of the polymerization solution (precursor emulsion) prepared in (1.1) was diluted two-fold with pure water. The diluted solution was stirred in a 10-L three necked flask and heated to 80° C. A 10% by mass sodium hydroxide aqueous solution was added dropwise thereto so that pH was maintained 10 or higher to hydrolyze $-SO_2F$ included in a fluoropolymer. The decrease in pH was stopped after about 3 hours from the start of the hydrolysis, but the solution was continuously hydrolyzed for additional 2 hours. During the hydrolysis, a precipitate of the fluoropolymer was not observed.

(1.3) Ultrafiltration Process

Dilute sulfuric acid was added to the reaction solution prepared in (1.2) to adjust pH to 8, and the solution was subjected to ultrafiltration using an ultrafiltration equipment produced by Merck Millipore. An ultrafiltration membrane with a cut off molecular weight of 10000 (produced by Merck Millipore, Pelicon 2 Filter) was inserted into a stainless-steel holder that was produced by Merck Millipore to form an ultrafiltration unit. The reaction solution prepared in (1.2) was poured into a 10-L beaker, and the solution was fed to the ultrafiltration unit using a liquid-sending pump (produced by Merck Millipore easy-load MasterFlex 1/P). The filtrate including impurities was discharged out of the system, and the treated solution was returned to the beaker. Ultrafiltration was performed with appropriately adding purified water to a beaker in an amount equivalent to the amount of the discharged filtrate. The addition of pure water was stopped when the electrical conductivity of the filtrate became 10 $uS \cdot cm^{-1}$ and the ultrafiltration was stopped when 1 L of treated solution was collected. Thus, an aqueous dispersion A was obtained. Measurement of the electrical conductivity was performed using a conductivity meter Twin Cond B-173 produced by HORIBA, Ltd. The time for the ultrafiltration treatment was 5 hours.

(1.4) Ion Exchange Process

An amount 200 g of Amberlite IR120B produced by Rohm and Haas Company was converted into an acidic resin using sulfuric acid. The acidic resin was sufficiently rinsed with pure water and filled into a glass burette. An amount 200 g of the aqueous dispersion A prepared in (1.3) was allowed to pass through the burette over 1 hour to obtain an acidic aqueous dispersion B (perfluorocarbon-sulfonic acid resin dispersion). The solid concentration of the resulting perfluorocarbon-sulfonic acid resin dispersion was 12.5% by mass. The average particle size of the perfluorocarbon-sulfonic acid resin was 50 nm, and the aspect ratio thereof was 1.0.

The average particle size and the aspect ratio were determined as described below. A perfluorocarbon-sulfonic acid resin dispersion was applied to an aluminum foil and the like, and an aqueous medium was removed therefrom to give a perfluorocarbon-sulfonic acid resin. Aggregate of the perfluorocarbon-sulfonic acid resin was observed using a scanning electron microscope and the like. Each of 20 particles on a microscope image was measured for the length of a long axis and the length of a short axis. A ratio of the length of a long axis to the length of a short axis (long axis/short axis) was determined. An average of the ratios was determined as the aspect ratio. An average of the length of a long axis and the length of a short axis was determined as the average particle size.

To 1000 g of the polymerization solution prepared in (1.1) was added 2000 g of water and nitric acid so that coagulation occurred. The solution was filtered to obtain a coagulated polymer and the polymer was redispersed into water. The redispersion and the filtration were repeated three times. The resulting polymer was dried at 90° C. for 24 hours and continuously dried at 120° C. for 5 hours in a hot air dryer to give 220 g of a dried polymer (perfluorocarbon-sulfonic acid resin precursor). The MI of the dried polymer was 1.0 g/10 min.

The EW of the polymer was measured according to the same method as that in Example 1 to be 450.

(1.5) Production of Coating Material Including Curable Functional Group-Containing Polymer ZEFFLE SE310 produced by Daikin Industries, LTD. (vinylidene fluoride resin/acrylic resin composite resin aqueous emulsion, pH=7, solid concentration 51%) was used as a base emulsion.

An amount 10.0 parts by weight of water, 0.3 parts by weight of FS013B (produced by Dow Corning Corporation) as a defoaming agent, 4.0 parts by weight of ethylene glycol, and 0.5 parts by weight of 28% aqueous ammonia were mixed. Then, 66.2 parts by weight of ZEFFLE SE310 was added and the mixture was stirred. An amount 23 parts by weight of the aqueous dispersion B prepared in (1.4) was added thereto, and the mixture was stirred at 400 rpm for 1 hour to give an aqueous coating composition (CS1).

Then, similarly to Example 1, CS1 was applied by spraying to a base in an amount of 50 g/m$^2$, and dried at room temperature for 30 minutes. Thus, a test plate was prepared.

Example 11

Production of Coating Material Including Titanium Oxide Particle that is Covered with Perfluorocarbon-sulfonic Acid Resin An amount 10 parts by mass of titanium oxide ST-01 (produced by ISHIHARA SANGYO KAISHA, LTD.: adsorption surface area 300 m$^2$/g) as a photocatalyst, 90 parts by mass of CS1, and 100 parts by weight of water were blended. An amount 260 parts by mass of 1.2-mm glass beads was added and dispersed in the mixture using a pigment disperser at 1500 rpm for 2 hour. Then, the dispersion was filtered through a #80 mesh sieve to remove the glass beads to prepare a titanium oxide dispersion.

The titanium oxide dispersion was spray-dried and turned into powder. Thus, titanium oxide particles which were covered with a perfluorocarbon-sulfonic acid resin and had an average particle size of 5 μm were produced.

An amount 10.0 parts by weight of water, 0.3 parts by weight of FS013B (produced by Dow Corning Corporation) as a defoaming agent, 4.0 parts by weight of ethylene glycol, and 0.5 parts by weight of 28% aqueous ammonia were mixed. Then, 66.2 parts by weight of ZEFFLE SE310 was added and the mixture was stirred. An amount 5 parts by weight of the titanium oxide particles each covered with a perfluorocarbon-sulfonic acid resin was added thereto, and the mixture was stirred at 400 rpm for 2 hours to prepare an aqueous coating composition (CS2).

Each of the CS1 and CS2 was applied by air-spraying to an aluminum plate of 5 mm thickness, allowed to stand for 1 hour at room temperature, and dried at 80° C. for 30 minutes. Thus, a test plate including a dried coating film of 20 μm thickness was formed.

The static contact angle with water of the obtained coating films was measured with a contact angle meter (produced by Kyowa Interface Science Co., LTD.). The contact angle of the coating film obtained from CS1 was 45 degrees and the contact angle of the coating film obtained from CS2 was 33 degrees.

Comparative Example 2

An amount 10.0 parts by weight of water, 0.3 parts by weight of FS013B (produced by Dow Corning Corporation) as a defoaming agent, 4.0 parts by weight of ethylene glycol, and 0.5 parts by weight of 28% aqueous ammonia were mixed. Then, 66.2 parts by weight of ZEFFLE SE310 was added and the mixture was stirred for 1 hour. Thus, an aqueous coating composition (CS3) was obtained. The contact angle of the coating film of CS3 was measured similarly to the films of CS1 and CS2 to be 80 degrees.

The measurement results of the contact angles of the films of CS1, CS2, and CS3 show that even if the coating material of the present invention includes a fluoropolymer, such as ZEFFLE SE310, having a curable functional group, the coating film formed from the coating material has high hydrophilic properties.

Example 12

Preparation of Perfluorocarbon-sulfonic Acid Resin Solution

The pellet of the perfluorocarbon sulfonic acid resin precursor obtained in Preparation Example 1 was brought into contact with an aqueous solution including potassium hydroxide (15% by mass) and methyl alcohol (50% by mass) at 80° C. for 20 hours to be hydrolyzed. The resulting pellet was then immersed in water at 60° C. for 5 hours. Then, the pellet was immersed in a 2 N hydrochloric acid aqueous solution at 60° C. for 1 hour, and the immersion was repeated 5 times with the use of a new hydrochloric acid aqueous solution each time. The resultant was rinsed with ion-exchange water and dried. Thus, a perfluorocarbon-sulfonic acid resin (A4) including a polymerization unit represented by —($CF_2$—$CF_2$)— and a polymerization unit represented by —($CF_2$—CF(—O—($CF_2$)$_2$—$SO_3$H))— was obtained.

The EW of the perfluorocarbon sulfonic acid resin that was hydrolyzed and acid-treated was 730 (A4). The MI of the resin precursor was 0.8 g/10 minutes (A4). The equilibrium water absorption of the resin was 9% by weight (A4). The maximum water absorption of the resin that was immersed in water at 23° C. for 3 hours was 18% by weight (A4).

The pellet was placed into a 5-L autoclave together with an ethanol aqueous solution (water:ethanol=50:50 (mass ratio)), and the autoclave was sealed. The contents were heated to 160° C. with stirring using a stirring blade. The temperature was maintained for 5 hours. Then, the autoclave was self-cooled. Thus, a uniform 5% by mass perfluorocarbon sulfonic acid resin dispersion was prepared. To 100 g of the perfluorocarbon sulfonic acid resin dispersion was added 100 g of pure water and the contents were stirred. The resulting solution was heated to 80° C. and concentrated with stirring to have a solid concentration of 20% by mass. Thus, a 20% perfluorocarbon sulfonic acid resin dispersion was obtained. A dispersion including a perfluorocarbon sulfonic acid resin with an EW of 730 was defined as AS4.

Preparation of Photocatalyst-containing Coating Material

An amount 10 parts by mass of titanium oxide ST-01 (produced by ISHIHARA SANGYO KAISHA, LTD.: adsorption surface area 300 m$^2$/g), 50 parts by mass of the 20% perfluorocarbon sulfonic acid resin solution AS4, and 40 parts by weight of ethanol were blended. Thus, a photocatalyst-containing coating material (CS4) that includes a composition for a phtocatalyst was prepared.

The photocatalyst-containing coating material was applied by spraying to an aluminum plate coated with black acrylic urethane in an amount of 50 g/cm$^2$, and dried at room temperature for 30 minutes. Thus, a test plate including a photocatalyst-containing film was produced.

The result of the outdoor antifouling property test was that no contamination was observed on the test plate, and excellent antifouling-properties were obtained.

A photocatalyst activity test was performed as described below. A 5% by mass ethanol solution of methylene blue was applied to the surface of the coating film, and the surface was exposed to light emitted from FL20S BLB type black light produced by Toshiba Lighting & Technology for 3 days. Here, the intensity of ultraviolet measured using an ultraviolet meter UVR-2 (light receiving part UD-36 (usable for light with a wavelength of 310 to 400 nm) produced by TOPCON CORPORATION was used as a light receiving part) produced by TOPCON CORPORATION was adjusted to 1 mW/cm$^2$. Then, the degree of decomposition of the methylene blue was evaluated by observing color fading of the film surface. The result was that the methylene blue was completely decomposed, and excellent photocatalyst activity was obtained.

In order to evaluate the decomposition rate of the methylene blue, a 10 cm$^2$ test plate was immersed into 10 mL of a 0.01 mmol/l aqueous solution of methylene blue, and exposed to light emitted from a backlight for 2 hours. Then, the absorbance (at 664 nm) was measured using a UV/VIS spectrometer (V-550, JASCO Corporation), and the methylene blue concentration was calculated. A decrease in the concentration was determined as the methylene blue decomposition rate. As a result, the methylene blue decomposition rate was 65%, and excellent photocatalyst activity was obtained.

The result of the durability evaluation through the exposure test was that the gloss retention was 75%, and excellent durability was obtained.

Comparative Example 3

A photocatalyst-containing coating material that includes a composition for a photocatalyst was prepared according to the same way as that of Example 12, except Nafion DE2021 (a 20% solution, EW: 1050, produced by E.I. du Pont de Nemours& Co.) was used instead of the 20% perfluorocarbon-sulfonic acid resin solution AS4 used in Example 12. A test plate was produced similarly to Example 12 using the composition for a photocatalyst. The test plate was subjected to a photocatalyst activity test similarly to Example 12. The result was that the color of the methylene blue remains slightly. Similarly to Example 12, the methylene blue decomposition rate was evaluated. The result was that the methylene blue decomposition rate was 50%. Further, the result of a durability test (evaluation) similarly to Example 12 was that the gloss retention was 65%.

The results of Example 12 and Comparative Example 3 clearly showed that the composition for a photocatalyst (Example 12), including a perfluorocarbon-sulfonic acid resin with an EW of 730 as a binder was formed into a photocatalyst film excellent in photocatalyst activity, compared to a film formed from the composition for a photocatalyst (Comparative Example 3), including Nafion DE2021 with an EW of 1050 as a binder.

It is considered the reason is that the perfluorocarbon-sulfonic acid resin with an equivalent weight EW in a specific range, which is blended as a binder, has high hydrophilic properties, and thereby, sufficient water can be supplied to a surface of metal oxide having a photocatalyst function, and therefore excellent photocatalyst activity can be exerted.

Preparation Example 2

Preparation of Perfluorocarbon-sulfonic Acid Resin Precursor

A 3-L pressure tight vessel made of SUS-316 equipped with a stirring blade and a temperature controlling jacket was charged with 1501 g of reverse osmosis water, 7.5 g of $C_7F_{15}COONH_4$, and 62.9 g of $CF_2=CFO(CF_2)_2-SO_2F$. The system was purged with nitrogen and evacuated. Then, tetrafluoroethylene ($CF_2=CF_2$) (hereinafter, referred to as "TFE") was introduced into the vessel to increase an internal pressure to 0.2 MPaG. The temperature in the system was controlled to 50° C., and TFE was further introduced thereinto to increase an internal pressure to 0.8 MPa. A solution of 0.75 g of $(NH_4)_2S_2O_8$ in 10 g of water was introduced into the system and polymerization was started. TFE was additionally fed so that the internal pressure was maintained at 0.8 MPa. $CF_2=CFO(CF_2)_2-SO_2F$ was additionally fed according to the additional amount of TFE to finally give a molar ratio of $CF_2=CFO(CF_2)_2-SO_2F$ and TFE of 0.418:1. After 471 minutes from the polymerization start, the pressure of TFE was discharged to terminate the polymerization when 437 g of TFE was additionally introduced. An amount 140 g of water was added to 70 g of the obtained polymerization solution, the solution was heated to 50° C., and 7 g of concentrated hydrochloric acid was fed into the solution. The solution was filtered to obtain a coagulated polymer and the polymer was redispersed into water. Such a series of operations of redispersion with water and coagulation filtration with hydrochloric acid was repeated three times. The obtained polymer was dried in a hot air dryer to give a perfluorocarbon-sulfonic acid resin precursor (a5).

Example 13

Preparation of Perfluorocarbon-sulfonic Acid Resin Solution

The pellet of the perfluorocarbon sulfonic acid resin precursor (a5) (EW after hydrolysis and acid treatment: 910) prepared in Preparation Example 2 was brought into contact with an aqueous solution including potassium hydroxide (15% by mass) and methyl alcohol (50% by mass) at 80° C. for 20 hours to be hydrolyzed. The resulting pellet was then immersed in water at 60° C. for 5 hours. Then, the pellet was immersed in a 2 N hydrochloric acid aqueous solution at 60° C. for 1 hour, and the immersion process was repeated 5 times with the use of a new hydrochloric acid aqueous solution each time. The resultant was rinsed with ion-exchange water and dried. Thus, pellet of a perfluorocarbon-sulfonic acid resin (A component) including a sulfonic acid group ($SO_3H$) was obtained. The EW of the perfluorocarbon sulfonic acid resin that was hydrolyzed and acid-treated was 910 (A5). The MI of the resin precursor was 1.5 g/10 minutes (A5). The equilibrium water absorption of the resin was 8% by weight (A5). The maximum water absorption of the resin that was immersed in water at 23° C. for 3 hours was 16% by weight (A5).

The pellet was placed into a 5-L autoclave together with an ethanol aqueous solution (water:ethanol=50:50 (mass ratio)), and the autoclave was sealed. The contents were heated to 160° C. with stirring using a stirring blade. The temperature was maintained for 5 hours. Then, the autoclave was self-cooled. Thus, a uniform 5% by mass perfluorocarbon sulfonic acid resin solution was prepared as a solution AS5-1.

To 100 g of the perfluorocarbon sulfonic acid resin solution AS5-1 was added 100 g of pure water and the contents were stirred. The resulting solution was heated to 80° C. and concentrated with stirring to have a solid concentration of 10% by mass. Thus, a concentrated perfluorocarbon sulfonic acid resin solution AS5-2 was prepared.

Preparation of Photocatalyst-containing Coating Material

A mixture of 10 g of a perfluoro sulfonic acid resin solution AS5-1 and 50 g of ethanol (produced by Wako Pure Chemical Industries, Ltd.) was added to 10 g of the PBI solution used in Examples 4 to 6 to give a pale dark reddish-brown transparent solution. To the solution was added 84 g of the concentrated perfluorocarbon-sulfonic acid resin solution AS5-2 with stirring. Thus, a yellow transparent dispersion was obtained. The resulting yellow transparent solution was heated to 80° C. and concentrated with stirring. Thus, a photocatalyst binder solution BS5 having a moisture content of 71% by mass, an ethanol content of 19% by mass, and a solid concentration of 10% by mass was obtained.

An amount 10 parts by mass of titanium oxide ST-01 (produced by ISHIHARA SANGYO KAISHA, LTD.: adsorption surface area 300 m$^2$/g), 90 parts by mass of the photocatalyst binder solution BS5 were blended to prepare a photocatalyst-containing coating material (DS5).

The photocatalyst-containing coating material (DS5) was applied by spraying to an aluminum plate coated with black acrylic urethane in an amount of 50 g/cm$^2$, and dried at room temperature for 30 minutes. Thus, a test plate including a photocatalyst-containing film was produced.

The result of the outdoor antifouling property test was that no contamination was observed on each test plate, and excellent antifouling-properties were obtained.

The result of the durability test through the exposure test was that the gloss retention was 90% and excellent durability was obtained.

Example 14

Preparation of Photocatalyst-containing Coating Material

A mixture of 15 g of a perfluoro sulfonic acid resin solution (AS4) and 50 g of ethanol (produced by Wako Pure Chemical Industries, Ltd.) was added to 10 g of the PBI solution used in Examples 4 to 6 to prepare a dark reddish-brown transparent solution. The dark reddish-brown transparent solution was allowed to pass through an ion-exchange resin to be subjected to ion exchange to prepare a dispersion colored in yellow. The resulting dispersion was heated to 80° C. and concentrated with stirring to have a solid concentration of 10% by mass. Thus, a dispersion BS4 was prepared.

An amount 10 parts by mass of titanium oxide ST-01 (produced by ISHIHARA SANGYO KAISHA, LTD.: adsorption surface area 300 m$^2$/g) and 90 parts by mass of the photocatalyst binder solution BS4 were blended to prepare a photocatalyst-containing coating material (DS4).

The photocatalyst-containing coating material (DS4) was applied by spraying to an aluminum plate coated with black acrylic urethane in an amount of 50 g/cm$^2$, and dried at room temperature for 30 minutes. Thus, a test plate including a photocatalyst-containing film was produced.

The result of the outdoor antifouling property test was that no contamination was observed on each test plate, and excellent antifouling-properties were obtained. The result of the durability test through the exposure test was that the gloss retention was 89%, and excellent durability was obtained.

Example 15

A photocatalyst-containing coating material was prepared according to the same way as that of Example 13, except the concentrated perfluorocarbon-sulfonic acid resin solution AS5-2 was used instead of the photocatalyst binder solution BS5 used in Example 13. A test plate was formed similarly to Example 13 using the photocatalyst-containing coating material. The test plate was evaluated similarly to Example 13. The result of the outdoor antifouling property test was that good antifouling-properties were obtained. The result of the durability evaluation through the exposure test was that the gloss retention was 75%.

The results of Examples 13 and 14 and Examples 12 and 15 clearly showed that the photocatalyst-containing coating material (Examples 13 and 14) including as a binder a mixture of a perfluorocarbon-sulfonic acid resin and a polyazol compound was formed into a photocatalyst coating film excellent in durability, compared to a film formed from the photocatalyst-containing coating material (Examples 12 and 15) including only a perfluorocarbon-sulfonic acid resin as a binder.

It is considered the reason is that the mixture of a perfluorocarbon-sulfonic acid resin and a polyazol compound is a composition that is not decomposed by radical species which are generated by photocatalysis and part of the perfluorocarbon-sulfonic acid resin and part of the polyazol compound form chemical bonds, which results in an improvement in mechanical strength. Thus, the coating material in Example 13 including a polyazol compound may be formed into a photocatalyst film excellent in chemical stability and physical stability.

Example 16

Preparation of Perfluorocarbon-sulfonic Acid Resin Solution

To 100 g of the perfluorocarbon sulfonic acid resin solution (AS5-1) was added 100 g of pure water and the contents were stirred. The resulting solution was heated to 80° C. and concentrated with stirring to have a solid concentration of 20% by mass. Thus, a 20% perfluorocarbon sulfonic acid resin solution AS5-3 was prepared.

To 100 g of the 20% by mass perfluorocarbon-sulfonic acid resin solution AS5-3 was added 0.8 g of cerium carbonate hydrate ($Ce_2(CO_3)_3.8H_2O$) so that the cerium ion content was 10% by mass, and the solution was stirred at room temperature for 8 hours. Bubbles containing $CO_2$ were generated at the start of the stirring. A uniform transparent liquid composition was finally obtained as a photocatalyst binder solution ES5.

An amount 10 parts by mass of titanium oxide ST-01 (produced by ISHIHARA SANGYO KAISHA, LTD.: adsorption surface area 300 m$^2$/g), 50 parts by mass of the photocatalyst binder solution BS5, and 40 parts by mass of ethanol were blended to prepare a photocatalyst-containing coating material (FS5).

The photonatalyst-containing coating material (FS5) was applied by spraying to an aluminum plate coated with black acrylic urethane in an amount of 50 g/cm$^2$, and dried at room temperature for 30 minutes. Thus, a test plate including a photocatalyst-containing film was formed.

The result of the outdoor antifouling property test was that no contamination was observed on the test plate, and excellent antifouling-properties were obtained.

The result of the durability evaluation through the exposure test showed that the gloss retention was 88%, and excellent durability was obtained.

Example 17

To 100 g of the 20% by mass perfluorocarbon-sulfonic acid resin solution AS4 was added 0.8 g of cerium carbonate hydrate ($Ce_2(CO_3)_3.8H_2O$) so that the cerium ion content was 10% by mass, and the solution was stirred at room temperature for 8 hours. Bubbles containing $CO_2$ were generated at the start of the stirring. A uniform transparent liquid composition was finally obtained as a photocatalyst binder solution ES4.

An amount 10 parts by mass of titanium oxide ST-01 (produced by ISHIHARA SANGYO KAISHA, LTD.: adsorption surface area 300 m$^2$/g), 50 parts by mass of the photocatalyst binder solution ES4, and 40 parts by mass of ethanol were blended to prepare a photocatalyst-containing coating material (FS4).

The result of the outdoor antifouling property test was that no contamination was observed on the test plate, and excellent antifouling-properties were obtained. The result of the durability evaluation through the exposure test showed that the gloss retention was 86% and excellent durability was obtained.

The results of Examples 16 and 17 and Examples 12 and 15 clearly showed that the photocatalyst-containing coating materials (Examples 16 and 17) including as a binder a perfluorocarbon-sulfonic acid resin to which a polyvalent transition metal ion was blended could be formed into a photocatalyst coating film excellent in durability, compared to a film formed from the photocatalyst-containing coating material (Examples 12 and 15) including only a perfluorocarbon-sulfonic acid resin as a binder.

It is considered the reason is that the perfluorocarbon-sulfonic acid resin to which a polyvalent transition metal ion is blended is a composition that is not decomposed by radical species that are generated by photocatalysis, and part of the perfluorocarbon-sulfonic acid resin and part of the polyvalent transition metal ion form ionic bonds, which results in an improvement in mechanical strength. Thus, the photocatalyst-containing coating material including a polyvalent transition metal ion may be formed into a photocatalyst film excellent in chemical stability and physical stability.

INDUSTRIAL APPLICABILITY

A coating film formed from a coating material in accordance with the present invention which is applied to a base material and dried and cured has high durability, high hydrophilic properties, and excellent contamination resistance.

The invention claimed is:

1. A coating material, comprising a perfluorocarbon sulfonic acid resin and a curable functional group-containing fluoropolymer,
wherein the perfluorocarbon sulfonic acid resin is a copolymer including a polymerization unit represented by —($CF_2$—CFZ)—, in the formula, Z being H, Cl, F, or a C1-C3 perfluoroalkyl group, and a polymerization unit represented by —($CF_2$—CF(—O—($CF_2$)$_m$—$SO_3$H))—, in the formula, m being an integer of 1 to 12,
the perfluorocarbon sulfonic acid resin has an equivalent weight EW of 200 to 1000, and
the curable functional group is at least one functional group selected from the group consisting of a hydroxyl group, a carboxyl group, a glycidyl group, a silyl group, a silanate group, and an isocyanate group.

2. The coating material according to claim 1,
wherein the perfluorocarbon sulfonic acid resin has an equivalent weight EW of 200 to 800.

3. A laminate, comprising:
a base material; and
a hydrophilic layer formed from the coating material according to claim 1.

4. The laminate according to claim 3, further comprising a primer layer including a curable functional group-containing fluoropolymer between the base material and the hydrophilic layer.

5. A coating material, comprising a perfluorocarbon sulfonic acid resin, a photocatalyst and a curable functional group-containing fluoropolymer,
wherein the perfluorocarbon sulfonic acid resin is a copolymer including a polymerization unit represented by —($CF_2$—CFZ)—, in the formula, Z being H, Cl, F, or a C1-C3 perfluoroalkyl group, and a polymerization unit represented by —($CF_2$—CF(—O—($CF_2$)$_m$—$SO_3$H))—, in the formula, m being an integer of 1 to 12,
the perfluorocarbon sulfonic acid resin has an equivalent weight EW of 200 to 1000, and
the curable functional group is at least one functional group selected from the group consisting of a hydroxyl group, a carboxyl group, a glycidyl group, a silyl group, a silanate group, and an isocyanate group.

6. A coating material, comprising a perfluorocarbon sulfonic acid resin, a polyazol compound and a curable functional group-containing fluoropolymer,
wherein the perfluorocarbon sulfonic acid resin is a copolymer including a polymerization unit represented by —($CF_2$—CFZ)—, in the formula, Z being H, Cl, F, or a C1-C3 perfluoroalkyl group, and a polymerization unit represented by —($CF_2$—CF(—O—($CF_2$)$_m$—$SO_3$H))—, in the formula, m being an integer of 1 to 12,
the perfluorocarbon sulfonic acid resin has an equivalent weight EW of 200 to 1000,
the amount of the polyazol compound is 0.001 to 50% by mass relative to the total mass of the perfluorocarbon sulfonic acid resin and the polyazol compound, and
the curable functional group is at least one functional group selected from the group consisting of a hydroxyl group, a carboxyl group, a glycidyl group, a silyl group, a silanate group and an isocyanate group.

7. The coating material according to claim 6,
wherein the polyazol compound is poly[2,2'-(m-phenylene)-5,5'-bibenzoimidazole].

8. A coating material, comprising a perfluorocarbon sulfonic acid resin, a polyvalent transition metal ion and a curable functional group-containing fluoropolymer,
wherein the perfluorocarbon sulfonic acid resin is a copolymer including a polymerization unit represented by —($CF_2$—CFZ)—, in the formula, Z being H, Cl, F, or a C1-C3 perfluoroalkyl group, and a polymerization unit represented by —($CF_2$—CF(—O—($CF_2$)$_m$—$SO_3$H))—, in the formula, m being an integer of 1 to 12,
the perfluorocarbon sulfonic acid resin has an equivalent weight EW of 200 to 1000, and
the curable functional group is at least one functional group selected from the group consisting of a hydroxyl group, a carboxyl group, a glycidyl group, a silyl group, a silanate group, and an isocyanate group.

* * * * *